US012652713B2

(12) United States Patent
Dhanani et al.

(10) Patent No.: US 12,652,713 B2
(45) Date of Patent: Jun. 9, 2026

(54) SYSTEMS, METHODS, AND DEVICES FOR SMART V2X PREEMPTIVE CONNECTION

(71) Applicant: Apple Inc., Cupertino, CA (US)

(72) Inventors: Tarakkumar G Dhanani, San Jose, CA (US); Vijay Gadde, San Jose, CA (US); Vijay Venkataraman, San Jose, CA (US); Sharad Garg, Cupertino, CA (US); Rohit Thareja, Redwood City, CA (US); Sanjeevi Balasubramanian, San Jose, CA (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 18/447,595

(22) Filed: Aug. 10, 2023

(65) Prior Publication Data

US 2024/0073979 A1 Feb. 29, 2024

Related U.S. Application Data

(60) Provisional application No. 63/402,246, filed on Aug. 30, 2022.

(51) Int. Cl.
*H04W 76/14* (2018.01)
*H04W 64/00* (2009.01)

(52) U.S. Cl.
CPC ......... *H04W 76/14* (2018.02); *H04W 64/006* (2013.01)

(58) Field of Classification Search
CPC ...... H04W 4/46; H04W 64/006; H04W 76/14
USPC ...................................................... 455/456.1
See application file for complete search history.

(56) References Cited

U.S. PATENT DOCUMENTS

| | | | |
|---|---|---|---|
| 10,972,958 B1 * | 4/2021 | Wang | H04W 88/04 |
| 2018/0295655 A1 * | 10/2018 | Cavalcanti | H04W 4/46 |
| 2020/0228948 A1 * | 7/2020 | Watfa | H04W 48/16 |
| 2021/0023526 A1 | 1/2021 | Watanabe et al. | |
| 2022/0130296 A1 * | 4/2022 | Kamiya | G08G 1/0962 |
| 2023/0093601 A1 * | 3/2023 | Pendleton | G06V 20/58 |
| | | | 701/23 |

FOREIGN PATENT DOCUMENTS

| | | |
|---|---|---|
| CN | 115909776 A | 4/2023 |
| WO | 2020067816 A1 | 2/2020 |

* cited by examiner

*Primary Examiner* — Qutbuddin Ghulamali
(74) *Attorney, Agent, or Firm* — Eschweiler & Potashnik, LLC; Matthew Glause

(57) ABSTRACT

Smart vehicle-to-everything (V2X) preemptive connections for emergency and/or potential accident scenarios. A V2X-enabled vehicle may determine a current route of the vehicle and high-risk areas through which the vehicle may travel (e.g., a hospital zone, high pedestrian traffic area, etc.). The vehicle may determine a distance (d) from a beginning of the high-risk area and begin establishing a V2X connection upon reaching the determined distance. The V2X-enabled vehicle may also, or alternatively, pre-emptively establish a V2X connection upon detecting an event initiative of an emergency, a hazardous situation, or a potential emergency. Examples of such events may include a sharp turn, a vehicle speed exceeding a speed threshold, a sudden acceleration or declaration, etc. A preemptive V2X connection may, for example, enable vehicles to begin communicating with one another faster in case of a threat, emergency, or unsafe conditions for vehicles in the area.

20 Claims, 15 Drawing Sheets

*700*

DETERMINE V2X CONNECITON TRIGGGER(S)          ~710

720

YES          TRAVEL ROUTE
DESIGNATED?          NO 730          740

DETERMINE ROUTE-BASED,
HIGH-RISK AREAS          DETERMINE RADIUS-BASED,
HIGH-RISK AREAS

DETERMINE V2X CONNECTION TRIGGER
BASED ON ROUTE AND HIGH-RISK AREA

800

300

L = 8.1

DEISGNATED TRAVEL
ROUTE

L = 8.2

L = 8.3

V2X CONNECTION
TRIGGER

L = 8.4

V2X PREEMPTIVE
DISTANCE

HIGH-RISK
AREA OR
CONDITION

L = 8.5

L = 8.6

DEISGNATED
TRAVEL
DESTINATION

DETERMINE V2X CONNECTION TRIGGER
BASED ON ROUTE AND HIGH-RISK AREA

900

L = 9.1

INITIALLY PLANNED
ROUTE

L = 9.2

DETECT ABRUPT TURN
(V2X CONNECTION TRIGGER)

NEW ROUTE
(UNPLANNED)

L = 9.3

V2X CONNECTION
TRIGGER

L = 9.4

V2X PREEMPTIVE
DISTANCE

HIGH-RISK
AREA OR
CONDITION

L = 9.5

L = 9.6

INITIALLY
DEISGNATED
DESTINATION

SYSTEMS, METHODS, AND DEVICES FOR SMART V2X PREEMPTIVE CONNECTION

RELATED APPLICATIONS

This application claims the benefit of U.S. Provisional Application No. 63/402,246, filed on Aug. 30, 2022, the contents of which are hereby incorporated by reference in their entirety.

FIELD

This disclosure relates to wireless communication networks and mobile device capabilities.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology may include solutions for enabling user equipment (UE) to communicate with one another.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
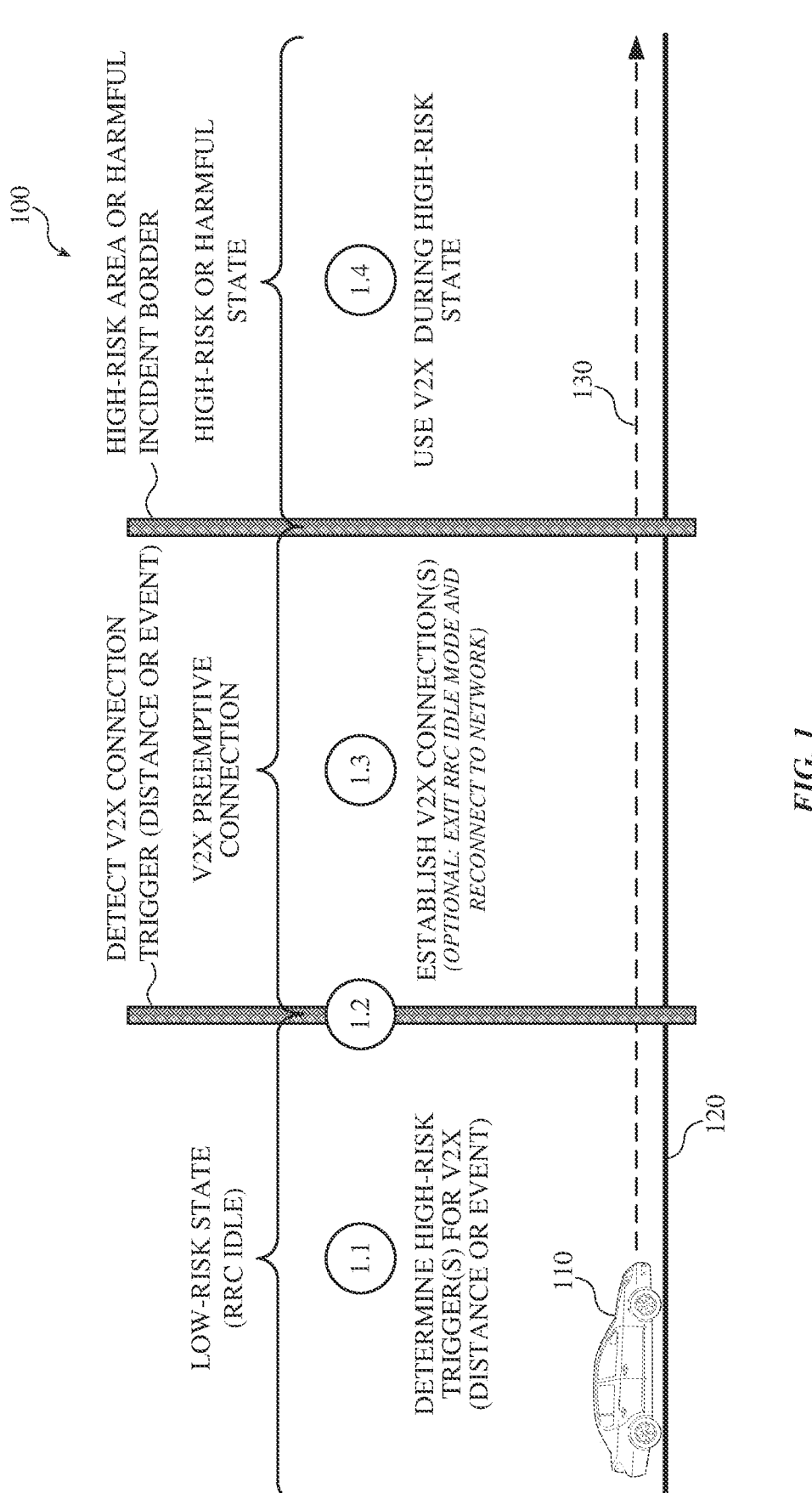
FIG. 1 is a diagram of an example overview according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless networks may include user equipment (UEs) capable of communicating with base stations, wireless routers, satellites, and other network nodes. Such devices may operate in accordance with one or more communication standards, such as 2nd generation (2G), 3rd generation (3G), 4th generation (4G) (e.g., long-term evolution (LTE)), 5th generation (5G) (e.g., new radio (NR)), or 6th generation (6G) communication standards of the 3rd generation partnership project (3GPP). Internet-of-Things (IoT) devices (or IoT UEs) may utilize one or more types of communication technologies, such as proximity-based service (ProSe) or device-to-device (D2D) communications, vehicle-to-anything (V2X) communications, sidelink (SL) communications, and more.

V2X communications, as described herein, may include a scenario in which a vehicle operates as a UE to discover, establish a connection, and communicate, with one or more of a variety of wireless devices via SL (e.g., a D2D communication). Examples of such devices may include a smartphone, a V2X-capable vehicle, and/or another type of UE or IoT device. V2X communications may also include so-called vehicle-to-vehicle (V2V) communications, vehicle-to-infrastructure (V2I) communications, etc. A UE, as described herein, may refer to a smartphone, tablet device, wearable wireless device, a vehicle capable of V2X communications, a portion of a vehicle capable V2X communications, and/or another type of wireless-capable device. As such, references herein to a "vehicle" and features enabling V2X communications may be applied to the broader categories of UEs in general and D2D or SL communications in general.

The direct communication between a vehicle and another device (e.g., a V2X communication) may involve a so-called PC5 interface. PC5 may refer to a reference point where a vehicle directly communicates with another device (e.g., smartphone, vehicle, UE, etc.) over a direct channel. In such a scenario, communication with a base station (e.g., via a Uu interface) may, or may not, be involved. At a system architectural level, ProSe may be a feature that specifies the architecture of the direct V2X communication. In 3GPP RAN specifications, the term sidelink or SL may refer to the direct communication over PC5. In short, the PC5 interface may enable vehicles and other devices to use communication standards (e.g., 4G, 5G, 6G, etc.) to establish direct (or SL) connections with one another without the traditional network infrastructure (e. g., base station, core networks, etc.). However, currently available V2X via PC5 technologies include certain limitations.

Currently available V2X connection techniques may be too slow to prevent or mitigate the risks of emergencies situations, car accidents, etc. For example, currently available techniques may cause a vehicle to remain in an idle mode, dormant mode, or some other type of non-connected mode prior to entering a high-risk area, such as a hospital zone, school zone, high-traffic area, high pedestrian traffic zone, or another type of high-risk area, and then beginning the transition to a V2X connected mode upon entering the high-risk area. Because of the time required to transition from a radio resource control (RRC) idle or non-connected mode to a connected V2X mode (e.g., during a SL random access channel (RACH) contention and procedure), the vehicle entering the area may not begin getting information through the V2X connection fast enough to avoid or mitigate the risks of an emergency and/or the damage that may result therefrom.

Techniques, described herein, may include solutions for overcoming V2X connection delays in high-risk areas by enabling smart V2X preemptive connections. A V2X-enabled vehicle may determine a current route of the vehicle and one or more high-risk areas through which the vehicle may travel (e.g., a hospital zone, school zone, high vehicle traffic area, high pedestrian traffic area, identified road hazards, etc.). The vehicle may determine a distance (d) from a beginning of the high-risk area and begin establishing a V2X connection (e.g., with other UEs, V2X-enabled vehicles, etc.) upon reaching the determined distance. A V2X connection may, therefore, be established upon or before the vehicle enters the high-risk area. The V2X-enabled vehicle may also, or alternatively, pre-emptively establish a V2X connection upon detecting an event initiative of an emergency, a hazardous situation, or a potential emergency. Examples of such events may include a sharp turn, a significant change in a center of gravity of the vehicle, a vehicle speed exceeding a vehicle speed threshold, a sudden acceleration or declaration, a collision, etc. A preemptive V2X connection may, for example, enable vehicles to begin communicating with one another faster in case of a threat, emergency, or unsafe conditions for vehicles in the area.

FIG. 1 is a diagram of an example overview 100 according to one or more implementations described herein. As shown, overview 100 may include vehicle 110 traveling along a road 120 according to travel trajectory 130. Vehicle 110 may include UE capabilities, including an ability to connect to one or more wireless devices using one or more wireless interfaces and frequency spectrums (e.g., licensed and unlicensed spectrums). For example, vehicle 110 may be capable of communicating with base stations via a 5G Uu interface. Vehicle 110 may also be capable of communicating with other UEs (e.g., smartphones, V2X-capable vehicles, etc.) using a PC5 interface. For purposes of explaining overview 100, assume that vehicle 110 is in a low-risk state and is connected to a base station or other wireless network device. A low-risk state may include a geographic location that is not in a high-risk area and/or has not recently detected a high-risk event, such as a sharp turn, rapid deceleration or acceleration, etc.

Vehicle 110 may determine high-risk triggers for establishing V2X connections (at 1.1). This may include determining a high-risk area within a radial distance of vehicle 110 and/or along a designated travel route (e.g., entered into vehicle 110 by a user) and a preemptive distance from the high-risk area beyond which vehicle 110 may proceed with establishing V2X connections and/or reestablish network connections. This may also, or alternatively, include vehicle 110 determining one or more high-risk events and/or combinations of high-risk events that may be, for example, indicative of dangerous driving conditions, an imminent car accident, etc., and the detection of which may cause vehicle 110 to establish V2X connections and/or network connections.

Vehicle 110 may proceed along travel trajectory 130 and detect a V2X connection trigger (at 1.2). The V2X connection trigger may include vehicle 110 entering within a predetermined distance from a high-risk area and/or detect a high-risk event (at 1.2). In response to detecting the V2X connection trigger, vehicle 110 may initiate and establish V2X connections (at 1.3). In some implementations, this may be referred to as a smart V2X preemptive connection, a V2X preemptive connection, and the like, since the V2X connections are established prior to vehicle 110 entering into a high-risk area and/or vehicle 110 experiencing an escalating threat or harmful incident, represented in FIG. 1 with a high-risk area border or a harmful incident border leading to a high-risk state. In some implementations, vehicle 110 may also, or alternatively, exit an idle or power save mode and reconnect to the network.

Upon entering a high-risk state, vehicle 110 may have already established V2X connections with other vehicles and/or devices, which may enable vehicle 110 to exchange D2D information about the risks, conditions, and/or harms experienced by other vehicles (at 1.4). In some implementations, vehicle 110 may use the information to, for example, avoid or mitigate further threat of harm and/or actual harm by modifying a speed, trajectory, and/or another type of behavior of vehicle 110. Vehicle 110 may also relay information from other vehicles and send information generated by vehicle 110 to other vehicles within or approaching the high-risk or harmful state. In some implementations, vehicle 110 may also, or alternatively, send or receive information about the risks, conditions, and/or harms of the high-risk state. While not shown, vehicle 110 may disconnect or discontinue the V2X connections and communications in response to, for example, the expiration of a preselected timer, traveling beyond a preselected threshold from the high-risk state, etc. Additional features and techniques are described below with reference to the Figures below.

Figure 2:
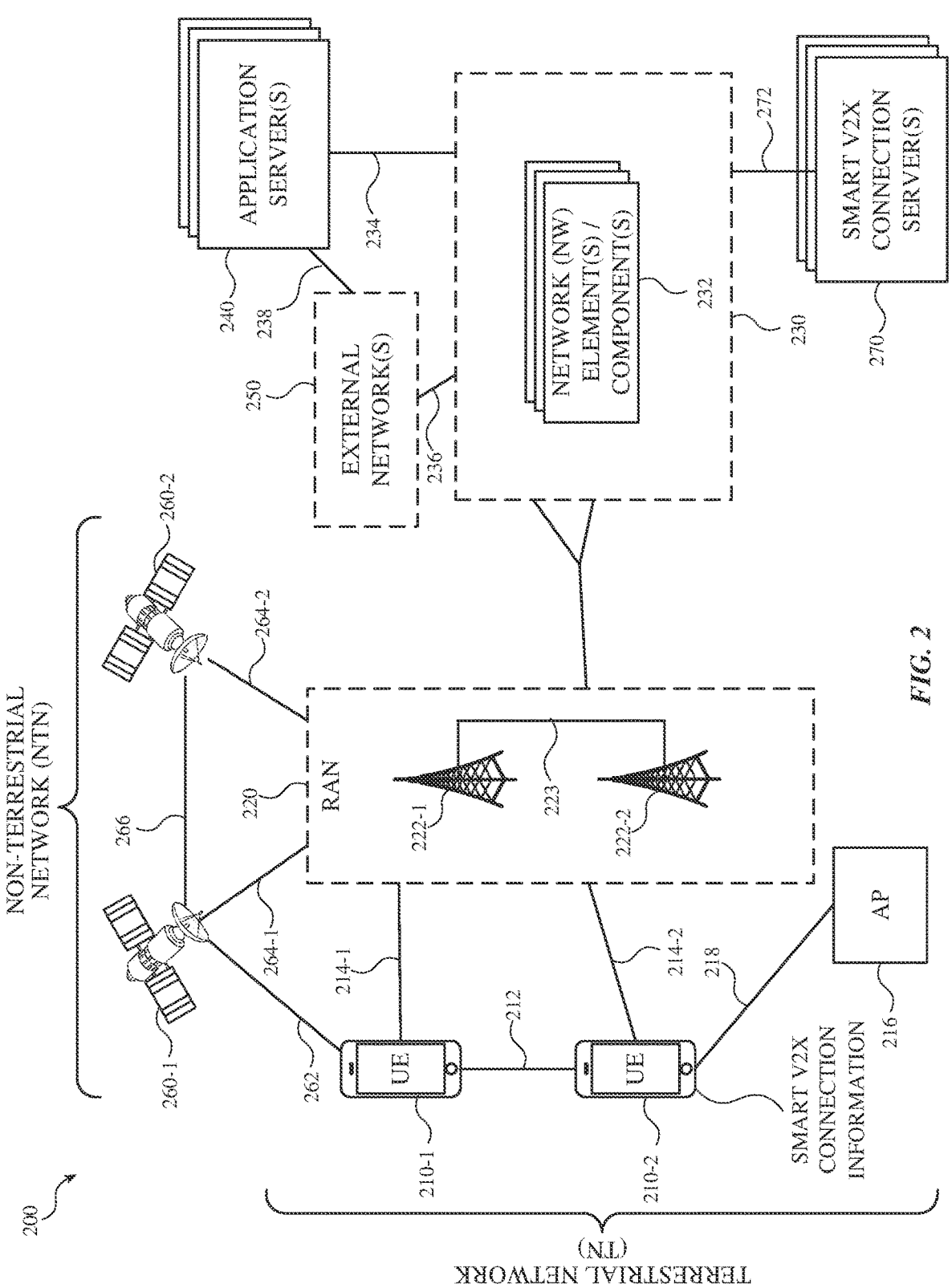
FIG. 2 is a diagram of an example network according to one or more implementations described herein.

FIG. 2 is an example network 200 according to one or more implementations described herein. Example network 200 may include UEs 210-1, 210-2, etc. (referred to collectively as "UEs 210" and individually as "UE 210"), a radio access network (RAN) 220, a core network (CN) 230, application servers 240, external networks 250, satellites 260-1, 260-2, etc. (referred to collectively as "satellites 260" and individually as "satellite 260"). As shown, network 200 may include a non-terrestrial network (NTN) comprising one or more satellites 260 (e.g., of a global navigation satellite system (GNSS)) in communication with UEs 210 and RAN 220.

The systems and devices of example network 200 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via interface 212 (e.g., one or more wireless channels, each of which may comprise a physical communications interface/layer). The connection may include an M2M connection, MTC connection, D2D connection, etc. In some implementations, UEs 210 may be configured to discover one another, negotiate wireless resources between one another, and establish connections between one another, without intervention or communications involving RAN node 222 or another type of network node. Note that RAN nodes 222 refers collectively to RAN nodes 222-1 and 222-2, whereas RAN node 222 refers individually to RAN nodes 222-1 and 222-2. In some implementations, discovery, authentication, resource negotiation, registration, etc., may involve communications with RAN node 222 or another type of network node.

UEs 210 may communicate and establish a connection with (e.g., be communicatively coupled) with RAN 220, which may involve one or more interfaces 214-1 and 214-2 (e.g., one or more wireless channels, each of which may comprise a physical communications interface/layer). Note that interfaces 214-1 and 214-2 may be collectively referred to as interfaces 214 or may be individually referred to as interface 214. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 222-1 and 222-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 230. Additionally, at least one of the MN or the SN may be operated with shared spectrum channel access, and functions specified for UE 210 can be used for an integrated access and backhaul mobile termination (IAB-MT). Similar for UE 210, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of RAN node 222.

As described herein, UE 210 may receive, store, process, and/or send smart V2X connection information (sometimes referred to as "V2X connection information" and the like). Smart V2X connection information may include information and instructions for performing one or more of the techniques and/or examples described herein. Smart V2X connection information may, for example, enable UE 210 to determine a current route of the vehicle and one or more high-risk areas through which the vehicle may travel (e.g., a hospital zone, school zone, high vehicle traffic area, high pedestrian traffic area, identified road hazards, etc.). UE 210 to may determine a distance (d) from a beginning of the high-risk area and begin establishing a V2X connection (e.g., with other UEs, V2X-enabled vehicles, etc.) upon reaching the determined distance.

Smart V2X connection information may also, or alternatively, enable a vehicle to preemptively establish a V2X connection (e.g., preemptive of a car accident) upon detecting an event indicative of an emergency, a hazardous situation, or a potential emergency. Examples of such events may include a sharp turn, a significant change in a center of gravity of the vehicle, a vehicle speed exceeding a vehicle speed threshold, a sudden acceleration or declaration, a collision, a loss of wheel traction, etc. The preemptive V2X connection may, for example, enable vehicles to begin communicating with one another faster in case of a threat, emergency, or unsafe conditions for vehicles in the area. In doing so, the connected vehicles may send out warnings to each other, rerouting vehicles away from a threat, determine and implement driving conditions (e.g., engaging all-wheel drive, slowing down, pulling over, etc.) that would mitigate the threat, and so on.

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc. The connection to AP 216 may comprise a local wireless connection, such as a connection consistent with any IEEE 802.11 protocol, and AP 216 may comprise a wireless fidelity (Wi-Fi®) router or other AP. While not explicitly depicted in FIG. 2, AP 216 may be connected to another network (e.g., the Internet) without connecting to RAN 220 or CN 230. In some scenarios, UE 210, RAN 220, and AP 216 may be configured to utilize LTE-WLAN aggregation (LWA) techniques or LTE WLAN radio level integration with IPsec tunnel (LWIP) techniques. LWA may involve UE 210 in RRC_CONNECTED being configured by RAN 220 to utilize radio resources of LTE and WLAN. LWIP may involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling may include encapsulating the entirety of original IP packets and adding a new packet header, thereby protecting the original header of the IP packets.

RAN 220 may include one or more RAN nodes 222-1 and 222-2 (referred to collectively as RAN nodes 222, and individually as RAN node 222) that enable interfaces 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells. As described below, in some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and to implementation where the base station, RAN node 222, etc., is a non-terrestrial network node (e.g., satellite 260).

Some or all of RAN nodes 222, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 222; a media access control (MAC)/physical (PHY) layer split wherein RRC, PDCP, radio link control (RLC), and MAC layers may be operated by the CRAN/vBBUP and the PHY layer may be operated by individual RAN nodes 222; or a "lower PHY" split wherein RRC, PDCP, RLC, MAC layers and upper portions of the PHY layer may be operated by the CRAN/vBBUP and lower portions of the PHY layer may be operated by individual RAN nodes 222. This virtualized framework may allow freed-up processor cores of RAN nodes 222 to perform or execute other virtualized applications.

In some implementations, an individual RAN node 222 may represent individual gNB-distributed units (DUs) connected to a gNB-control unit (CU) via individual F1 or other interfaces. In such implementations, the gNB-DUs may include one or more remote radio heads or radio frequency (RF) front end modules (RFEMs), and the gNB-CU may be operated by a server (not shown) located in RAN 220 or by a server pool (e.g., a group of servers configured to share resources) in a similar manner as the CRAN/vBBUP. Additionally, or alternatively, one or more of RAN nodes 222 may be next generation eNBs (i.e., gNBs) that may provide evolved universal terrestrial radio access (E-UTRA) user plane and control plane protocol terminations toward UEs 210, and that may be connected to a 5G core network (5GC) 230 via an NG interface.

Any of the RAN nodes 222 may terminate an air interface protocol and may be the first point of contact for UEs 210. In some implementations, any of the RAN nodes 222 may fulfill various logical functions for the RAN 220 including, but not limited to, radio network controller (RNC) functions such as radio bearer management, uplink and downlink dynamic radio resource management and data packet scheduling, and mobility management. UEs 210 may be configured to communicate using orthogonal frequency-division multiplexing (OFDM) communication signals with each other or with any of the RAN nodes 222 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 222 to UEs 210, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 222 may be configured to wirelessly communicate with UEs 210, and/or one another, over a licensed medium (also referred to as the "licensed spectrum" and/or the "licensed band"), an unlicensed shared medium (also referred to as the "unlicensed spectrum" and/or the "unlicensed band"), or combination thereof. In an example, a licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 210 and the RAN nodes 222 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

UEs 210 may implement various techniques for communicating via a licensed and unlicensed spectrum. Examples of such techniques may include license assisted access (LAA) and NR unlicensed (NR-U), which may include anchored NR-U and standalone NR-U. The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 210 to undergo a handover.

In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe. To operate in the unlicensed spectrum, UEs 210 and the RAN nodes 222 may also operate using the unlicensed spectrum via anchored NR-U and standalone NR-U operations, where the UE may be configured with a PCell, in addition to any SCells, in unlicensed spectrum. In anchored NR-U, UE 210 may use dual connectivity by using a licensed spectrum to communicate with an LTE anchor base station and an unlicensed spectrum to communicate with an NR-U node. Alternatively, UE 210 may use CA by using a licensed spectrum to communicate with an NR anchor base station and an unlicensed spectrum to communicate with an NR-U node. Standalone NR-U may involve a scenario in which UE 210 only communicates with the network via NR-U nodes.

The PDSCH may carry user data and higher layer signaling to UEs 210. The physical downlink control channel (PDCCH) may carry information about the transport format and resource allocations related to the PDSCH channel, among other things. The PDCCH may also inform UEs 210 about the transport format, resource allocation, and hybrid automatic repeat request (HARQ) information related to the uplink shared channel. Typically, downlink scheduling (e.g., assigning control and shared channel resource blocks to UE 210-2 within a cell) may be performed at any of the RAN nodes 222 based on channel quality information fed back from any of UEs 210. The downlink resource assignment information may be sent on the PDCCH used for (e.g., assigned to) each of UEs 210.

The PDCCH uses control channel elements (CCEs) to convey the control information, wherein several CCEs (e.g., 6 or the like) may consist of resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as EREGs. An ECCE may have other numbers of EREGs in some situations.

The RAN nodes 222 may be configured to communicate with one another via interface 223. In implementations where the system is an LTE system, interface 223 may be an X2 interface. In NR systems, interface 223 may be an Xn interface. The X2 interface may be defined between two or more RAN nodes 222 (e.g., two or more eNBs/gNBs or a combination thereof) that connect to evolved packet core (EPC) or CN 230, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 210 from an SeNB for user data; information of PDCP PDUs that were not delivered to a UE 210; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 220 may be connected (e.g., communicatively coupled) to CN 230. CN 230 may comprise a plurality of network elements 232, which are configured to offer various data and telecommunications services to customers/subscribers (e.g., users of UEs 210) who are connected to the CN 230 via the RAN 220. In some implementations, CN 230 may include an evolved packet core (EPC), a 5G CN, and/or one or more additional or alternative types of CNs. The components of the CN 230 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 230, application servers 240, and external networks 250 may be connected to one another via interfaces 234, 236, and 238, which may include IP network interfaces. Application servers 240 may include one or more server devices or network elements (e.g., virtual network functions (VNFs) offering applications that use IP bearer resources with CN 230 (e.g., universal mobile telecommunications system packet services (UMTS PS) domain, LTE PS data services, etc.). Application servers 240 may also, or alternatively, be configured to support one or more communication services (e.g., voice over IP (VoIP sessions, push-to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

As shown, example network 200 may include an NTN that may comprise one or more satellites 260-1 and 260-2 (collectively, "satellites 260"). Satellites 260 may be in communication with UEs 210 via service link or wireless interface 262 and/or RAN 220 via feeder links or wireless interfaces 264 (depicted individually as 264-1 and 264-2). In some implementations, satellite 260 may operate as a passive or transparent network relay node regarding communications between UE 210 and the terrestrial network (e.g., RAN 220). In some implementations, satellite 260 may operate as an active or regenerative network node such that satellite 260 may operate as a base station to UEs 210 (e.g., as a gNB of RAN 220) regarding communications between UE 210 and RAN 220. In some implementations, satellites 260 may communicate with one another via a direct wireless interface (e.g., 266) or an indirect wireless interface (e.g., via RAN 220 using interfaces 264-1 and 264-2).

Additionally, or alternatively, satellite 260 may include a GEO satellite, LEO satellite, or another type of satellite. Satellite 260 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and implementation, where the base station, RAN node 222, etc., is a non-terrestrial network node (e.g., satellite 260). As described herein, UE 210 and RAN node 222 (e.g., a base station) may communicate with one another, via interface 214, to enable enhanced power saving techniques.

Smart V2X connection servers 270 may include one or more servers, server devices, or network elements (e.g., VNFs) configured to receive, process, store, and/or send information. Smart V2X connection servers 270 may communicate with CN 230 via connection or interface 272, which may include IP network interfaces. Smart V2X connection servers 270 may include, manage, and/or have access to a database or another type of data repository, which may store one or more types of data. For example, smart V2X connection servers 270 may collect and store geographic information, date and time information, navigation and/or route information, regulatory information about one or more regulation entities, V2X connection trigger information, smart V2X information regarding UEs 210, and more.

Smart V2X connection servers 270 may also receive, process, store, and/or send smart V2X connection information to enable V2X preemptive connections for emergency and/or potential accident scenarios. Smart V2X connection information may include information and instructions for performing one or more of the techniques and/or examples described herein. Smart V2X connection information may, for example, enable UE 210 to determine a current route of the vehicle and one or more high-risk areas through which the vehicle may travel (e.g., a hospital zone, school zone, high vehicle traffic area, high pedestrian traffic area, identified road hazards, etc.). UE 210 may determine a distance (d) from a beginning of the high-risk area and begin establishing a V2X connection (e.g., with other UEs 210, V2X-enabled vehicles, etc.) upon reaching the determined distance. Smart V2X connection information may also, or alternatively, enable UE 210 to establish determine and monitor high-risk areas without a designated route and/or high-risk events such as sharp turns, abrupt stops, etc., which may prompt UE 210 to establish V2X preemptive connections and/or connections with RAN 220.

Figure 3:
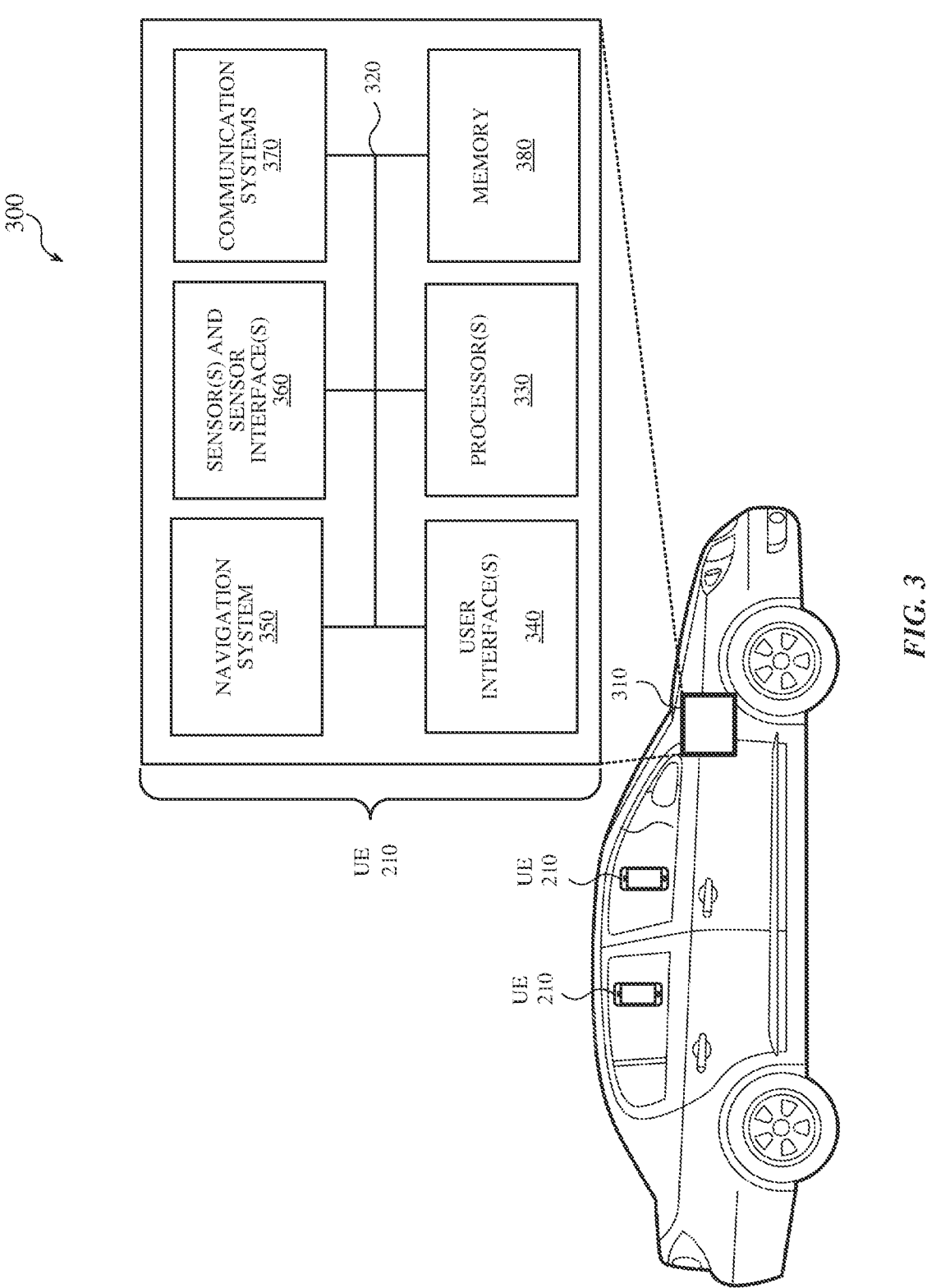
FIG. 3 is a diagram of an example vehicle according to one or more implementations described herein.

FIG. 3 is a diagram of an example vehicle 300 according to one or more implementations described herein. As shown, vehicle 300 may include vehicle control system 310 that includes communication circuitry 320, processor 330, user interfaces 340, navigation system 350, sensors and sensor interfaces 360, communication systems 370, and memory 380. The components (310-380) of vehicle 300 may be implemented as hardware, software, and/or a combination of hardware and software (e.g., processors, memory, storage devices, data transport circuitry, interface circuitry, software programs and instructions, etc.). In some implementations, vehicle 300 may include one or more fewer, additional, differently ordered and/or arranged components and/or circuitry than shown in FIG. 3. Additionally, or alternatively, one or more operations or functions of any of the components of vehicle 300, or any additional or alternative operations or functions, may be performed by another component, a combination of components, consolidated into a single component, etc. As such, vehicle 300 and the components and circuitry depicted in FIG. 3, are provided as a non-limiting example that may be used to implement one or more of the techniques described herein. In some implementations, vehicle control system 310 may be capable of performing as a type of UE and may therefore be referred to as UE 210.

Communication circuitry 320 may permit communication among the components of vehicle control system 310. Processor 330 may include one or more processors, circuitry, and/or memory components configured to provide general management, synchronize, control, access, and coordination to the components, systems, and subsystems of vehicle 300. Processor 330 may provide a platform through which components of vehicle 300 may be accessed, tested, installed, registered, updated, etc. Processor 330 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 330 may control the overall operation, or a portion thereof, of vehicle 300, based on, for example, an operating system (not illustrated) various applications and/or logic circuits of vehicle control system 310. Processor 330 may access instructions from memory 380, from other components of vehicle control system 310, or from a source external to vehicle control system 310 (e.g., a network, one/or more UEs 210, one or more auxiliary device, etc.).

User interface 340 may include an interface through which a user (e.g., a driver) may input information and/or receive output information. User interface 340 may include physical features, such as buttons, nobs, switches, and other features through which the user may interact physically. User interface 340 may include audio and/or visual features, such as microphones, speakers, lights, electronic screens, etc., through which the user may both receive information (e.g., audio and/or visual) and/or input information (e.g., via a microphone, screen-pressable buttons or other screen interface objects, etc.). User interface 340 may enable the user to change climate control settings, engage vehicle security features, control windows, seats, mirrors, entertainment system settings, and other features of vehicle 300. User interface 340 may enable the user access mobile applications and services, record and/or trigger user preferences, initiate and cancel vehicle operations, etc.

Navigation system 350 may include hardware and/or software configured to enable navigation features and services of vehicle 300. Navigation system 350 may operate in conjunction with one or more of processor 330, user interface 340, sensors and sensor interfaces 360, communication systems 370, and memory 380 to provide navigation services. For example, navigation system 350 may receive an input to determine a route, arrival time, etc., corresponding to a destination received from a user, via user interface 340, and a current geographic location determined by navigation system 350. The geographic location may be determined based on network information received from access points 216, RAN nodes 222 (e.g., base stations), satellites 260, etc. Navigation system 350 may also, or alternatively, coordinate with sensors and sensor interfaces 360 to implement driverless navigation services by, for example, receiving information from cameras, microphones, wireless output/input devices, etc., comparing the information with a current location, speed, route, and intended destination to control the vehicle in a complementary manner. Sensors and sensor interfaces 360 may include cameras, microphones, wireless output/input devices, tire pressure sensors, various engine monitoring sensors, accelerometers, etc., to monitor conditions relating to vehicle 300 and provide the components of vehicle control system 310 with inputs required to perform various functions.

Communication systems 370 may include one or more components that permit vehicle 300 to communicate with other devices and/or networks. Communication interface 370 may also include an antenna (or a set of antennas) that permit wireless communication, such as the transmission and reception of radio frequency (RF) signals. For example, communication systems 370 may include one or more types of wireless and/or wired features, including processors, memory, baseband circuitry, RF circuitry, front-end module (FEM), antennas, etc., to communicate with APs 216 via interface 218, RAN nodes 222 (e.g., base stations) via interfaces 214, satellites 260 via interface 264, and other vehicles or UEs 210 via interface 212.

Memory 380 may include a memory and/or storage device. For example, memory 380 may include random access memory (RAM), dynamic RAM (DRAM), read-only memory (ROM), programmable ROM (PROM), flash memory, or some other type of memory. Memory 380 may include a hard disk (e.g., a magnetic disk, an optical disk, a magneto-optic disk, a solid state disk, etc.) or some other type of computer-readable medium, along with a corresponding drive. Memory 380 may store software, data, instructions, and other information to enable operation of the components of vehicle control system 310. A computer-readable medium may be defined as a non-transitory memory device. A memory device may include space within a single physical memory device or spread across multiple physical memory devices.

As described herein, vehicle control system 310 may perform certain operations in response to processor 330 executing software instructions contained in a computer-readable medium, such as memory 380. The software instructions may be read into memory 380 from another computer-readable medium or from another device via communication interface 370. The software instructions contained in memory 380 may cause processor 330 to perform one or more processes described herein. Alternatively, hard-wired circuitry may be used in place of, or in combination with, software instructions to implement processes described herein. Examples of such processes may include those described with reference to FIGS. 1, 4, 6, 8, 10, and more. Thus, implementations described herein are not limited to any specific combination of hardware circuitry and software.

Figure 4:
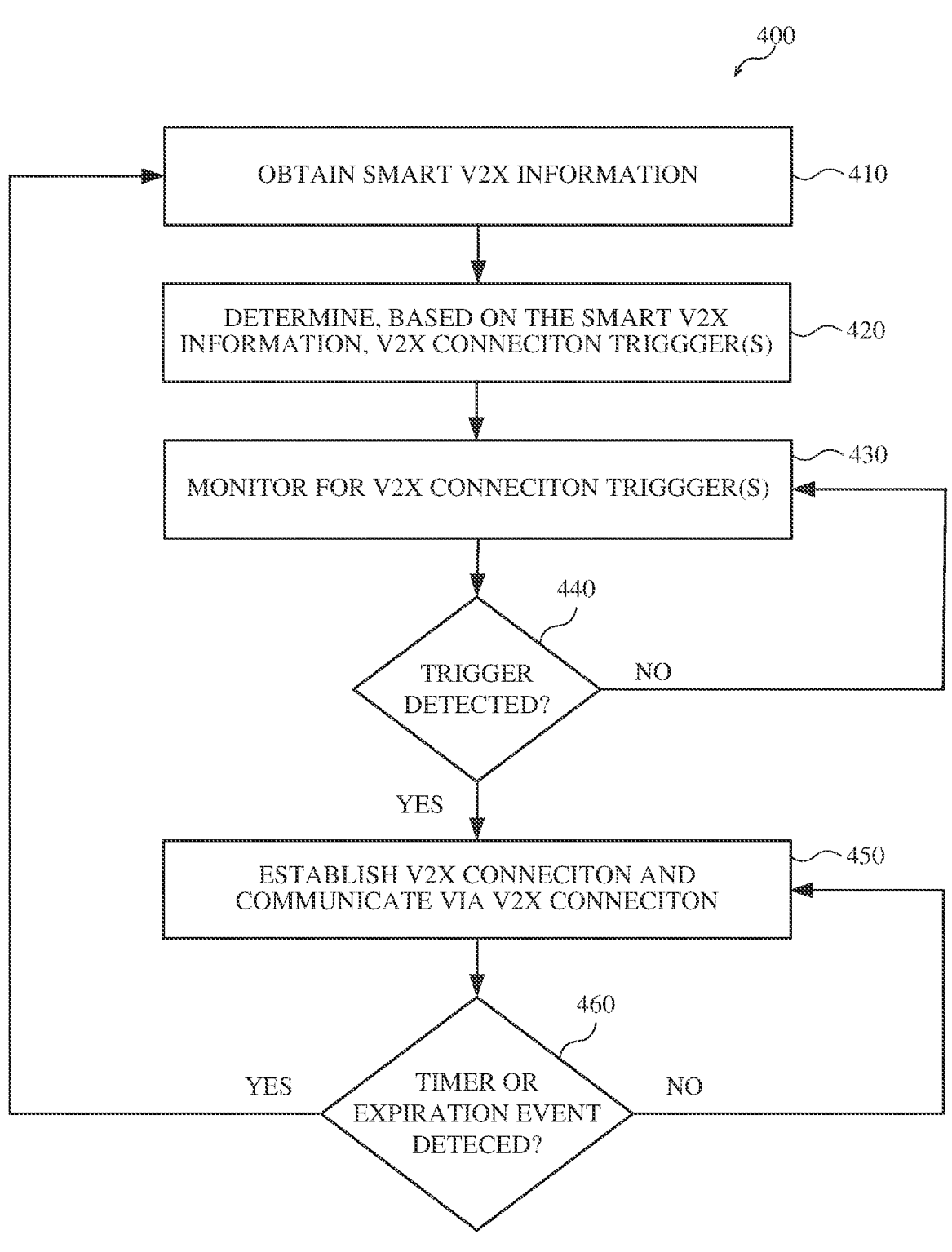
FIG. 4 is a diagram of an example process for smart vehicle-to-anything (V2X) preemptive connection according to one or more implementations described herein.

FIG. 4 is a diagram of an example process for smart V2X preemptive connection according to one or more implementations described herein. Process 400 may be implemented by UE 210, vehicle 300, and/or one or more components of vehicle control system 310. In some implementations, some or all of process 400 may be performed by one or more other systems or devices, including one or more of the devices of FIG. 2. Additionally, process 400 may include one or more fewer, additional, differently ordered and/or arranged operations than those shown in FIG. 4. In some implementations, some or all of the operations of process 400 may be performed independently, successively, simultaneously, etc., of one or more of the other operations of process 400. As such, the techniques described herein are not limited to a number, sequence, arrangement, timing, etc., of the operations or process depicted in FIG. 4. Example 400 is described below with periodic reference to FIGS. 5-11.

As shown, process 400 may include obtaining smart V2X information (block 410). For example, vehicle control system 310 may obtain smart V2X information from a local systems and storage device and/or from one or more remote servers. Vehicle control system 310 may obtain smart V2X information in accordance with a schedule (e.g., a reoccurring period of time (T)) and/or in response to one or more triggers (e.g., a driver designating a travel route, vehicle 300 beginning to move after a period of being stationary, a distance traveled, etc.)

Smart V2X information may include information and instructions for determining one or more V2X connection triggers, a geographic location of vehicle 300, a travel route of vehicle 300, high-risk areas within a specified distance from vehicle 300, and/or high-risk areas through which a travel route of vehicle 300 may pass. Smart V2X information may also, or alternatively, include information and instructions for determining distances from boundaries of high-risk areas, high-risk events and conditions, monitoring and detecting V2X connection triggers, establishing V2X connections, and/or performing, or enabling, one or more of the operations described herein. Additional examples of smart V2X information are discussed below with reference to FIG. 6.

Figure 5:
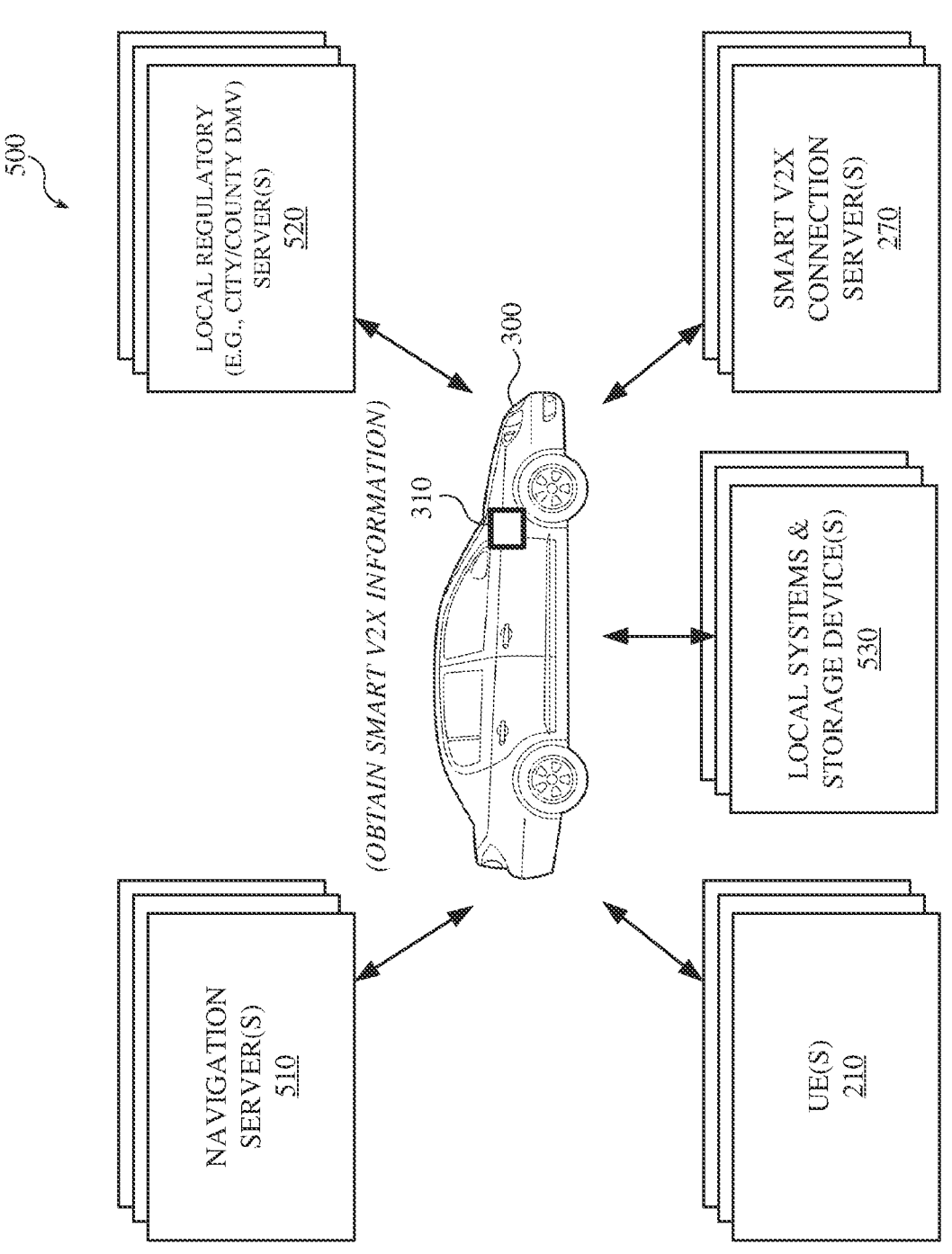
FIG. 5 is a diagram of an example of obtaining smart V2X information according to one or more implementations described herein.

FIG. 5 is a diagram of an example 500 for obtaining smart V2X information according to one or more implementations described herein. As shown, example 500 may include vehicle 300, one or more navigation servers 510, one or more local regulatory servers 520, one or more UEs 210, one or more local storage devices 530, and one or more smart V2X connection servers 270. UEs 210 and smart V2X connection server 270 are described above with reference to FIG. 2. Local systems & storage devices may be examples of one or more vehicle control system 310 components described above with reference to FIG. 3. Navigation servers 510 and local regulatory servers 520 may be examples of application servers 240 and/or another type of network device. In some implementations, some or all of example 500 may be implemented by one or more additional systems or devices, or alternatively by fewer systems or devices. Additionally, or alternatively, some or all of the operations of any of the systems or devices of FIG. 5 may be performed by, or in combination with, another system of device.

Vehicle control system 310 may communicate with navigation servers 510 to obtain information about, for example, a geographic location of vehicle 300, map information about roads, traffic conditions, points of interests (POI) (e.g., stores, parks, streets, highways, etc.) within a given range of vehicle 300, navigation information about how vehicle 300 may be navigated to a selected destination, etc. Vehicle 300 may provide navigation server 510 with information about a changing location of vehicle 300, a velocity (e.g., speed and direction) of vehicle 300, traffic conditions near vehicle 300, and/or one or more other types of information collected or obtained by vehicle 300 sensors. In some implementations, vehicle control system 310 may also obtain from navigation server 510 information about high-risk areas, traffic conditions, etc. Vehicle control system 310 may communicate with local regulatory server 520 to obtain information about driving conditions, speed limits, high-risk areas (e.g., hazardous zones, accident prone areas, areas under construction, etc. Examples of a local regulatory server 520 may include a server run by a transportation department or agency of a city, county, or state, a department of motor vehicles (DMV) server, etc.

Vehicle control system 310 may communicate with other UEs 210 (e.g., via a V2X connection) to obtain smart V2X information. In some implementations, vehicles 300 may exchange smart V2X information received from navigation server 510, local regulatory server 520, stored in a local storage device 530 (or local storage system), and/or obtained from smart V2X connection server 270. In some implementations, vehicle control system 310 may be configured to derive, enhance, and/or refine previous information about high-risk areas, high-risk events, V2X connection triggers, etc. (e.g., based on historical driving data and machine learning processes) and may share the information with other vehicles via a V2X connection and/or smart V2X connection server 270.

Vehicle control system 310 may generate smart V2X information using one or more local systems (e.g., navigation system 350, sensors and sensor interfaces 360, etc.) and may store the smart V2X information in local storage device 530 (e.g., memory 380). Smart V2X information received from navigation servers 510, local regulator servers, smart V2X connection servers 270, etc., may also be stored in local storage device 530. Smart V2X information derived, enhanced, and/or refined by vehicle control system 310 may also be stored in local storage device 530. Vehicle control system 310 may access locally stored smart V2X information to perform one or more of the smart V2X preemptive connection processes or operations described herein.

Vehicle control system 310 may communicate with smart V2X connection server 270 to obtain smart V2X information. In some implementations, smart V2X connection server 270 may collect and store smart V2X information from multiple vehicles 300, process, and store the smart V2X for later use, and distribute the smart V2X information to vehicles 300 to enable or facilitate one or more of the smart V2X preemptive connection processes or operations described herein. In some implementations, smart V2X connection server 270 may obtain smart V2X information from navigation servers 510 and/or local regulatory servers 520 and provide the smart V2X information from those sources to vehicle 300 as well. Smart V2X connection server 270 collects the smart V2X information in response to a request from vehicle 300 and/or periodically according to a designated schedule. In such implementations, vehicle 300 may therefore receive smart V2X information from a centralized source (e.g., smart V2X connection server 270).

Referring to FIG. 4, process 400 may include determining, based on smart V2X information, one or more V2X connection triggers (block 420). For example, vehicle control system 310 may determine V2X connection triggers based on smart V2X information. Examples of a V2X connection trigger may include a distance, along a programmed route, from a high-risk area, a distance from a high-risk area within a selected radial distance of vehicle 300, and a high-risk event (e.g., an abrupt change in acceleration, velocity, direction, etc.).

Figure 6:
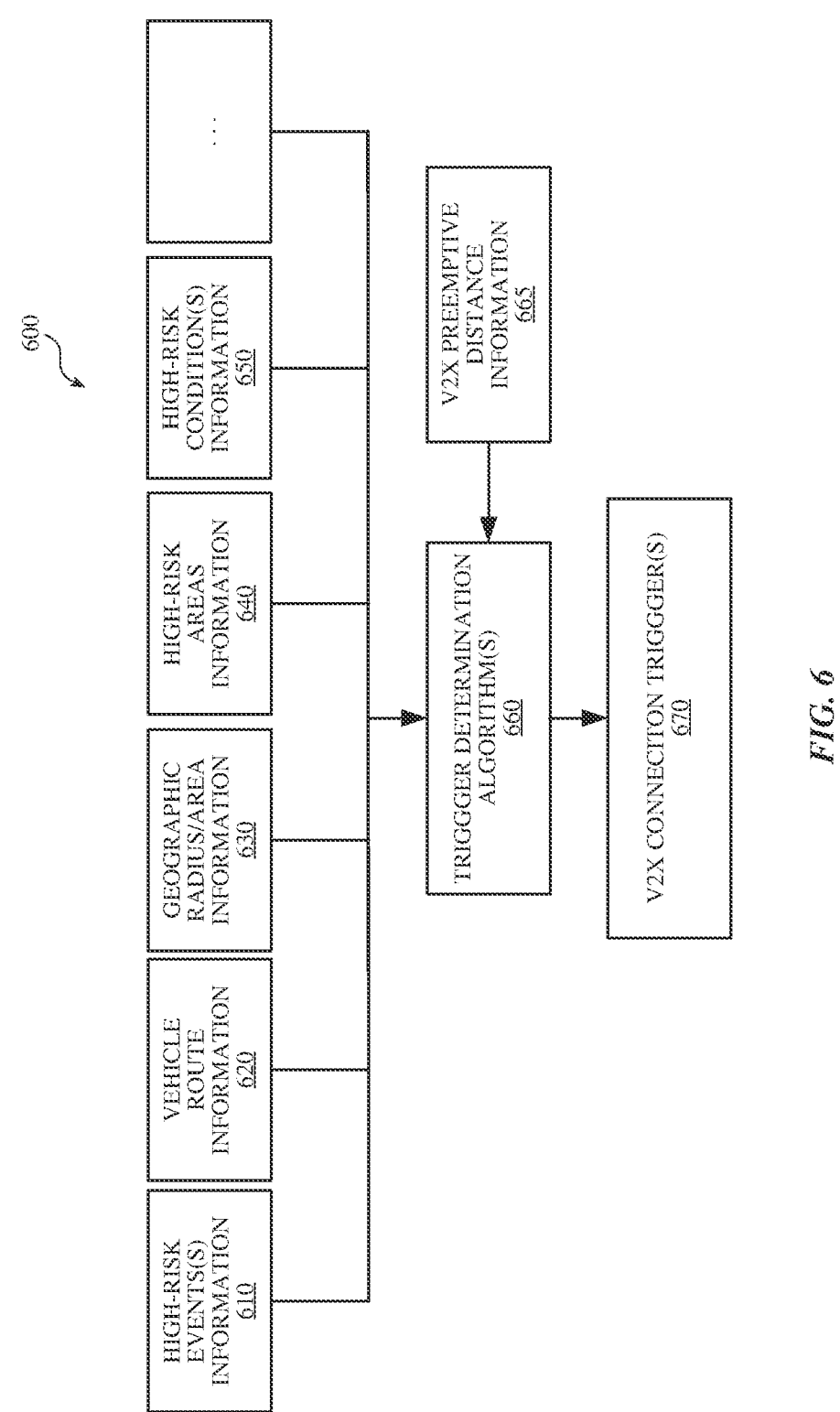
FIG. 6 is a diagram of an example of data structures and algorithms for determining a V2X connection triggers according to one or more implementations described herein.

FIG. 6 is a diagram of an example 600 of data structures and algorithms for determining a V2X connection triggers according to one or more implementations described herein. As shown, example 600 may include one or more types of information, such as high-risk event information 610, vehicle route information 620, geographic radius/area information 630, high-risk areas information, high-risk conditions information 650, and more. Example 600 may also include trigger determination algorithms 660, V2X preemptive distance information 665, and V2X connection triggers 670. One or more of information 610-650 may be obtain by vehicle control system 310 from a local source (e.g., system or local storage device 530) and/or from a remote source (e.g., other UEs 210, navigation servers 510, local regulatory servers 520, smart V2X connection servers 270, etc.). Vehicle control system 310 may use one or more of information 610-650 and algorithms 660 to produce or generate V2X connection triggers 670.

High-risk events information 610 may include one or more of a variety of types of information related to events or conditions indicative of vehicle 300 being in a risky situation, dangerous situation, or a situation that may lead to harm or an unwanted outcome. For example, high-risk events information 610 may include one or more sensors 360 detecting a change in acceleration, velocity, and/or distance beyond a change in acceleration threshold, a change in velocity threshold, and/or a change in distance threshold. Additional examples may include one or more sensors 360 detecting a change in a center of gravity of vehicle 300 above a change in center of gravity threshold, a velocity of vehicle 300 exceeding a selected percent above a speed limit, the breaks of vehicle 300 being suddenly activated, a collision being detected, a lane departure being detected, or a theft or break-in alarm being triggered.

Vehicle route information 620 may include one or more of a variety of types of information related to a planned, anticipated, or deduced route of vehicle 300. For example, vehicle route information 620 may a travel route determined by vehicle control system 310 based on a user (e.g., driver) entering a geographic destination into a map and navigation service supported by vehicle control system 310, and the vehicle control system 310 determining a navigation route from a current geographic location of vehicle 300 to the entered destination. In some implementations, vehicle route information 620 may be updated based on a timer and/or one or more triggers. For instance, if the driver departs from the charted route, vehicle control system 310 may update vehicle route information 620 based on the new location of the vehicle 300.

Geographic radius/area information 630 may include one or more of a variety of types of information related to a geographic area that vehicle control system 310 may use for detecting and monitoring high-risk areas and/or high-risk conditions. For example, geographic radius/area information 630 may include instructions and information to enable vehicle control system 310 to define an area within which high-risk areas and conditions are to be determined and for which V2X connection triggers determined. Geographic radius/area information 630 may include a distance that vehicle control system 310 may use as a radius for determining a circle as the area to be searched for high-risk areas and/or high-risk conditions. In some implementations, the length of the radius may vary based on one or more factors, such as an average travel velocity of vehicle 300, a top speed of roads near vehicle 300, an average speed of other vehicles near vehicle 300, current weather conditions, overall traffic conditions, etc. In some implementations, the radial distance may be increased in scenarios where vehicle 300 is more likely to travel quickly and may be decreased in scenarios where vehicle 300 is more likely to travel slowly.

High-risk areas information 640 may include one or more of a variety of types of information related to geographic areas or POIs associated with an elevated risk of harm to vehicle 300, property, or pedestrians. For example, high-risk areas information 640 may include names, addresses, geographic coordinates, etc., of an area around a school, hospital, airport, military base, etc. Additional examples of high-risk areas information 640 may include geographic coordinates of an area associated with a traffic accident rate above a selected threshold, an area associate with traffic accidents under certain weather and/or traffic conditions, a road, intersection, or freeway exchange system designated as being particularly tricky to navigate, etc.

High-risk conditions information 650 may include one or more of a variety of types of information related to a geographic area warranting increased driver caution, a change in driving behavior, or a departure from normal or typical driving behavior. For example, high-risk conditions information 650 may include geographic coordinates of an area affected by a traffic jam, a car accident, an area under construction, a detour, a flood, a landslide, a road temporarily blocked by law enforcement for a parade or race, etc. Additional examples of high-risk conditions information 650 may include a sudden change from a higher speed limit (e.g., of a highway) to a lower speed limit (e.g., of a rural town), an area experiencing particularly difficult driving conditions, such as heavy rain, snow, ice, strong wind, etc. In some implementations, high-risk conditions information 650 may be specific to a time, day, month, season, a type of weather, etc. For example, a canyon road may not be a high-risk area during good weather (e.g., on a sunny day) but may be a high-risk area/condition in bad weather (e.g., a snowstorm).

Trigger determination algorithm 660 may include instructions and information for determining V2X connection triggers 670. Trigger determination algorithm 660 may cause or enable vehicle control system 310 to obtain one or more types of information 610-650. Trigger determination algorithm 660 may also, or alternatively, cause or enable vehicle control system 310 to determine, based on information 610-650, V2X connection triggers 670. V2X connection trigger 670 may include a high-risk event type trigger (e.g., a car accident), a high-risk area type trigger, and/or a high-risk condition type (e.g., bad weather).

In some implementations, such as those involving high-risk areas and/or high-risk conditions, trigger determination algorithm 660 may obtain and/or determine V2X preemptive distance information 665 for determining a V2X connection trigger. V2X preemptive distance information 665 may include one or more of a variety of types of information related to a distance, measured from a high-risk area or high-risk condition, designating a location upon which vehicle control system 310 is to begin attempting to preemptively establish V2X connections with other vehicles 300 and/or UEs 210. In some implementations, the V2X preemptive distance may be static and universal (e.g., always the same distance). In other implementations, the V2X preemptive distance may vary based on one or more factors, such as driving conditions, a threat or risk rating associated with a specific high-risk area and/or high-risk condition, a type of high-risk area and/or high-risk condition, a measured or estimated probability of establishing a V2X connection before reaching the high-risk area and/or high-risk condition, etc.

In some implementations, trigger determination algorithm 660 may determine a single V2X connection trigger, multiple V2X connection triggers of a single V2X connection trigger type, a single V2X connection trigger for multiple V2X connection trigger types, or multipole V2X connection trigger for multiple V2X connection trigger types. In some implementations, vehicle control system 310 may dynamically determine whether, which type, how many, and/or for how long a given V2X connection trigger may be defined and monitored. In some implementations, vehicle control system 310 may make such determinations based on one or more factors, such as a priority among different types of V2X connection triggers, a level of risk associated with different V2X connection triggers and/or types of V2X connection triggers, an availability of information used to determine different V2X connection triggers, a maximum and/or minimum of V2X connection triggers and/or types of V2X connection triggers, a threat associated with V2X connection triggers based on a direction and velocity of vehicle 300, a threat associated with V2X connection triggers based on traffic or weather conditions, etc.

Figure 7:
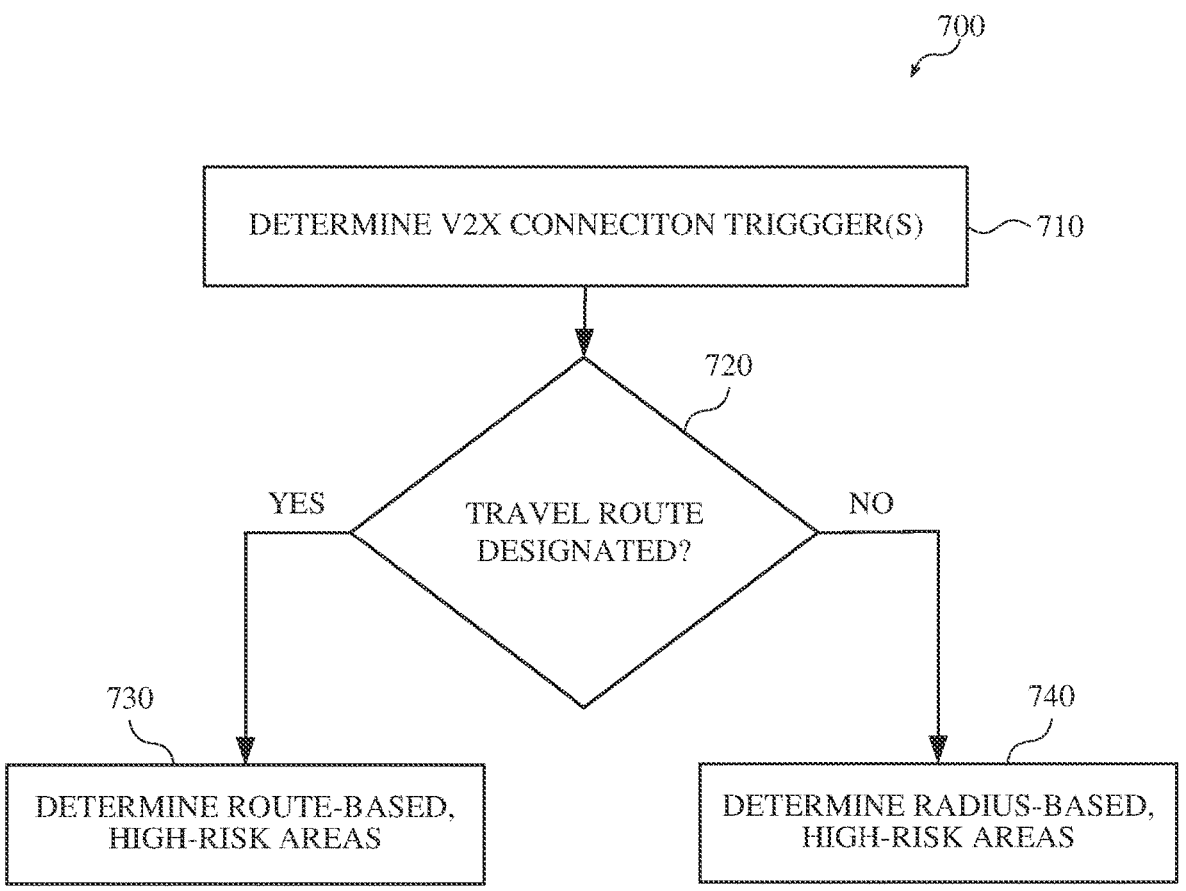
FIG. 7 is a diagram of an example of a process for determining a V2X connection trigger based on an availability of a route designation according to one or more implementations described herein.

FIG. 7 is a diagram of an example of a process 700 for determining a V2X connection trigger based on an availability of a route designation according to one or more implementations described herein. Process 700 may be implemented by UE 210, vehicle 300, and/or one or more components of vehicle control system 310. In some implementations, some or all of process 700 may be performed by one or more other systems or devices, including one or more of the devices of FIG. 2. Additionally, process 700 may include one or more fewer, additional, differently ordered and/or arranged operations than those shown in FIG. 7. In some implementations, some or all of the operations of process 700 may be performed independently, successively, simultaneously, etc., of one or more of the other operations of process 700. As such, the techniques described herein are not limited to a number, sequence, arrangement, timing, etc., of the operations or process depicted in FIG. 7.

As shown, process 700 may include determining a V2X connection trigger (block 710). For example, vehicle control system 310 may determine one or more V2X triggers for preemptively establishing a V2X connection with another device, such as a UE 210 or another V2X-enabled vehicle 300. Determining a V2X connection trigger may include vehicle control system 310 assessing whether a travel route has been designated (e.g., whether a user has entered a destination and caused vehicle control system 310 to determine a navigation route between a current location and the destination). When a travel route is designated (block 720— YES), process 700 may include determining route-based, high-risk areas (block 730). For example, when a travel route has been determined, vehicle control system 310 may identify high-risk areas relevant to vehicle 300 based on the travel route. In such scenarios, the high-risk areas may be those areas that overlap with the travel route and/or come within a threshold distance of the travel route.

When a travel route has not been designated (block 720—NO), process 700 may include determining radius-based, high-risk areas (block 740). For example, when a travel route has not been specified, vehicle control system 310 may identify high-risk areas relevant to vehicle 300 based on an area defined by a radial distance from a current geographic location of vehicle 300. In such implementations, vehicle control system 310 may continually, or periodically, update the high-risk areas as vehicle 300 moves. As described herein, vehicle control system 310 may determine V2X connection triggers for high-risk areas (whether route-based or radius-based) as a location that is a specified or determined distance from a nearest point of the high-risk area.

Referring to FIG. 4, process 400 may include monitoring for V2X connection triggers (block 430). For example, vehicle control system 310 may monitor sensor inputs of vehicle 300 and a geographic location of vehicle 300 for V2X connection triggers. As described herein, V2X connection triggers may be one or more events indicative of vehicle 300 being in a difficult or dangerous scenario that, for example, may result in an automobile accident of some sort. V2X connection triggers may also, or alternatively, include vehicle 300 being located at or within a specified distance for preemptively establishing V2X connections (e.g., before entering a high-risk area and/or high-risk condition).

When a V2X connection trigger is not detected (block 440—NO), process 400 may include continuing to monitor for V2X connection triggers (block 430). When a V2X connection trigger is detected (block 440—YES), process 400 may include establishing a V2X connection and communicating via the V2X connection (block 450). For example, prior to detecting a V2X connection trigger, vehicle control system 310 may not have an active V2X connection with another vehicle 300, UE 210, etc. However, upon detecting a V2X connection trigger, vehicle control system 310 may begin transmitting one or more SL signals (e.g., one or more SL broadcast signals, SL unicast signals, and/or SL groupcast signals) to initiate a V2X connection with another device capable of D2D communications (e.g., a V2X-enabled vehicle 300, UE 210, etc.). This may include communicating via a licensed and/or unlicensed frequency spectrum, performing a clear channel assessment (CCA) procedure, using one or more physical SL shared channels (PSSCH), physical SL control channels (PSCCH), and or physical SL feedback channels (PSFCH), using a shared SL channel occupancy time (COT), participating in a RACH procedure, etc.

Additionally, or alternatively, vehicle control system 310 may use the V2X connection to send and receive information. For example, V2X-connected devices (e.g., UEs 210, vehicle control systems 310, etc.) may exchange information relevant to the high-risk event, high-risk area, or high-risk condition corresponding to the V2X connection trigger. V2X-connected devices may also, or alternatively, exchange information about vehicles 300 and/or devices in the area, including information collected by the sensors (e.g., acceleration, velocity, location, etc.) collected by sensors of any or each V2X-connected device. Doing so may, for example, enable V2X-connected devices to respond accordingly by, for example, providing a driver of vehicle 300 of upcoming conditions, providing appropriate warnings, suggesting alternative routes, etc. In some implementations, V2X-connected devices may respond by, for example, automatically changing an acceleration, velocity, and/or location of vehicle 300. In some implementations, vehicle control system 310 may also, or alternatively, respond to a V2X connection trigger by exiting an RRC idle mode and attempting to reconnect and communicate with RAN 220 via RAN node 222 (e.g., base station).

Figure 8:
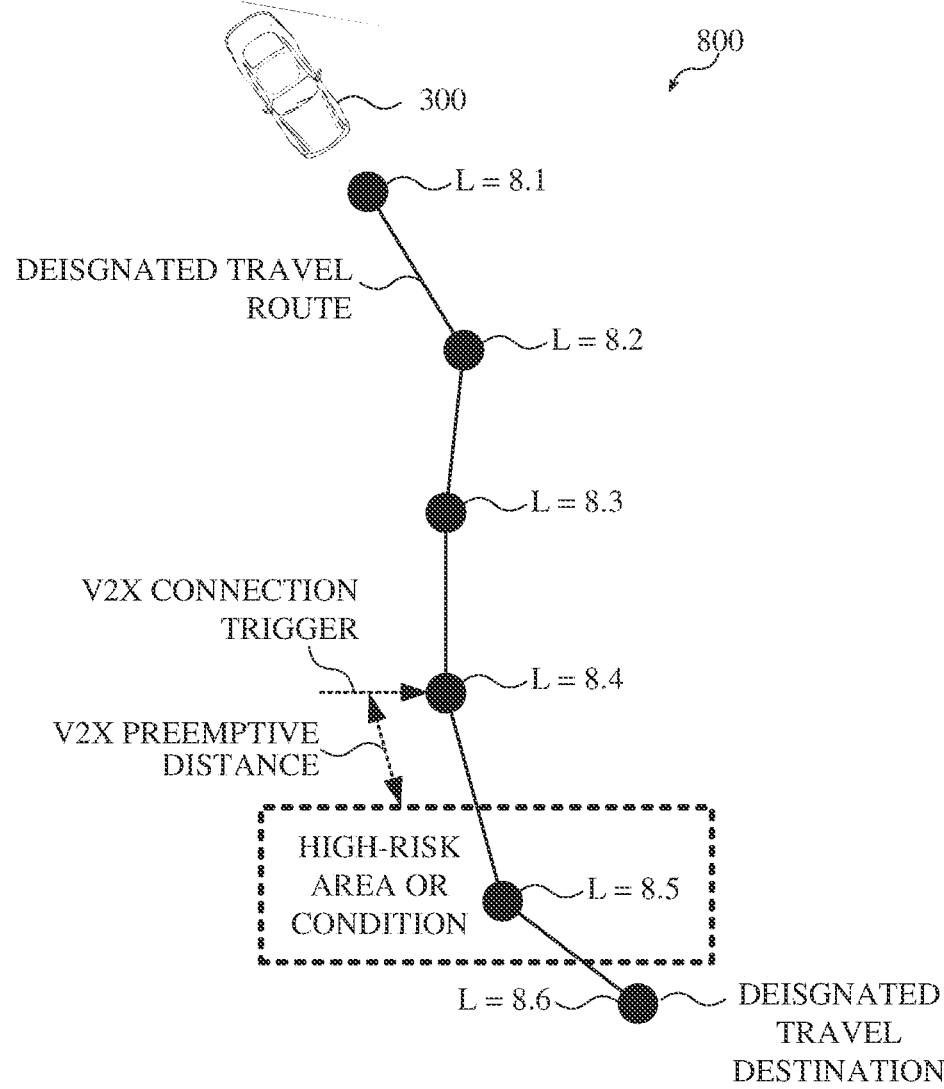
FIG. 8 is a diagram of an example of determining a V2X connection trigger based on a designated route intersecting with a high-risk area or condition according to one or more implementations described herein.

FIG. 8 is a diagram of an example 800 for determining a V2X connection trigger based on a designated route intersecting with a high-risk area or condition according to one or more implementations described herein. A vehicle control system 310 (not shown in FIG. 8) of vehicle 300 may designate a travel route that includes locations (L) 8.1, 8.2, etc., to 8.6. The vehicle control system 310 may also obtain smart V2X information about the route and determine, by comparing the route with the smart V2X information, that the route enters a high-risk area or condition. The vehicle control system 310 may determine a closest entry point of the high-risk area based on geographic information obtained about the high-risk area and the designated travel route. The vehicle control system 310 may also determine a V2X preemptive distance appropriate for such a scenario and use the preemptive distance to determine V2X connection trigger location at L=8.4. The vehicle control system 310 may also identify candidate V2X connection triggers as one or more potential events, such as a rapid change in acceleration, velocity, location, direction, etc.

The vehicle control system 310 may monitor for V2X connection triggers as vehicle 300 travels along the designated travel route. For purposes of explaining FIG. 8, assume that the vehicle control system 310 does not detect any high-risk events and that vehicle 300 remains on course from L 8.1 and through 8.3. Upon reaching the V2X connection trigger at L 8.4, vehicle control system 310 may respond by attempting to establish a preemptive V2X connection for the approaching high-risk area or condition. Additionally, or alternatively, vehicle control system 310 may attempt to establish (or reestablish) a connection with a network via RAN node 222 (e.g., base station). Whether through V2X connections or through a connection with the network, the vehicle control system 310 may communicate with a smart V2X connection server 270, and/or another type of server, to obtain information about warnings, conditions, and/or other types of descriptive information about the high-risk area or condition, which may be provided to a drive through one or more displays, prompts, or audio/visual messages or signals. Doing so may better enable the driver to make an informed decision about whether to continue on the designated travel route and enter the high-risk area or condition.

Assume that vehicle 300 establishes a V2X connection with another vehicle and exchanges appropriate information as vehicle 300 passes through the high-risk area or condition. Even after exiting the high-risk area or condition, the vehicle control system 310 may maintain the V2X connection until vehicle 300 has traveled a threshold distance away from the high-risk area or condition. In some implementations, vehicle 300 may also terminate the V2X connection if vehicle 300 parks or pulls over before entering the high-risk area or if vehicle turns and takes a detour away from the high-risk area. Accordingly, the techniques described herein provide solutions for dynamically establishing smart V2X preemptive connections for high-risk events, areas, and/or conditions.

Figure 9:
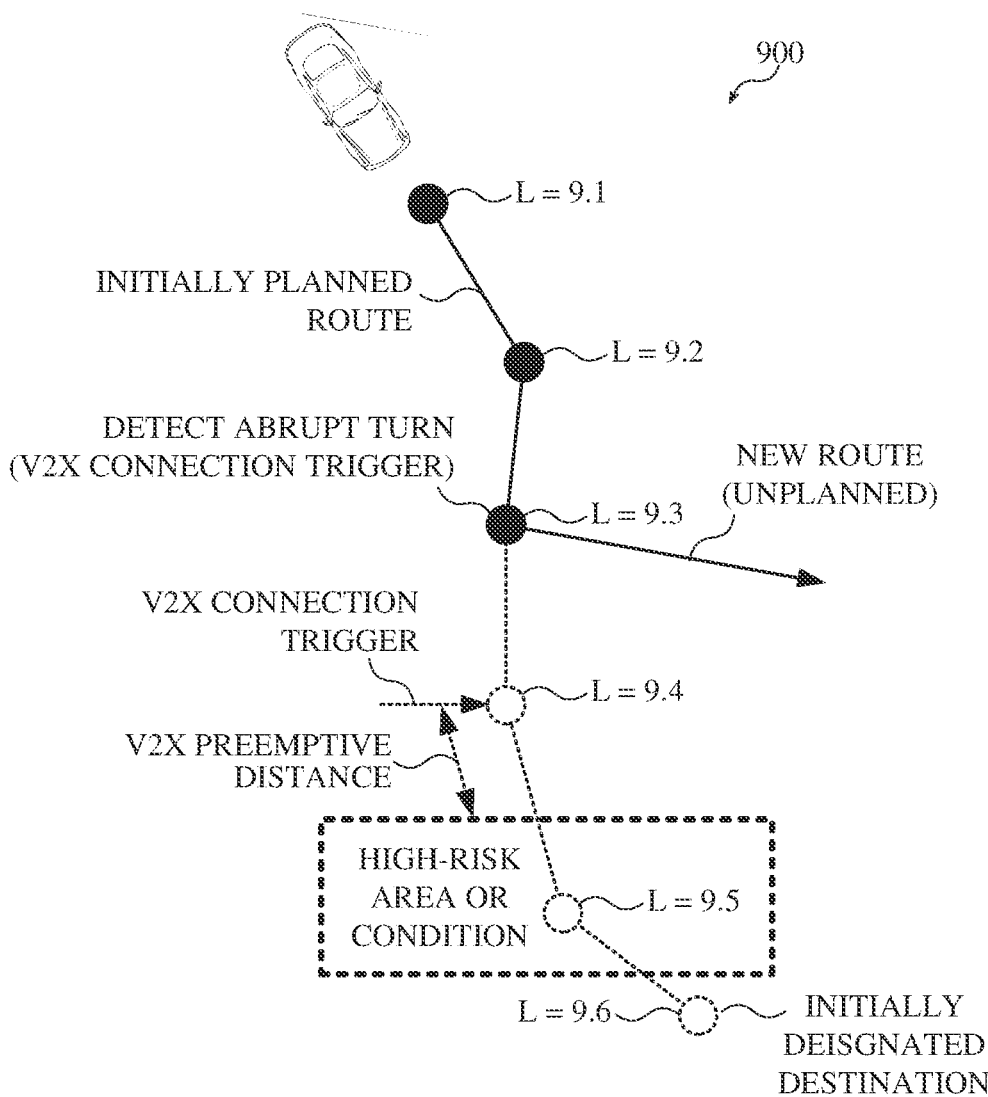
FIG. 9 is a diagram of an example of determining a V2X connection trigger based on detecting a high-risk event according to one or more implementations described herein.

FIG. 9 is a diagram of an example 900 of determining a V2X connection trigger based on detecting a high-risk event according to one or more implementations described herein. A vehicle control system 310 (not shown in FIG. 9) of vehicle 300 may designate a travel route that includes locations (L) 9.1, 9.2, etc., to 9.6. The vehicle control system 310 may also obtain smart V2X information about the route and determine, by comparing the route with the smart V2X information, that the route enters a high-risk area or condition. The vehicle control system 310 may determine a closest entry point of the high-risk area based on geographic information obtained about the high-risk area and the designated travel route. The vehicle control system 310 may also determine a V2X preemptive distance appropriate for such a scenario and use the preemptive distance to determine V2X connection trigger location at L=9.4. The vehicle control system 310 may also identify candidate V2X connection triggers as one or more potential events, such as a rapid change in acceleration, velocity, location, direction, etc.

The vehicle control system 310 may monitor for V2X connection triggers as vehicle 300 travels along the designated travel route. For purposes of explaining FIG. 9, assume that the vehicle control system 310 does not detect any high-risk events or changes in route from L 9.1 through L 9.2. However, as shown, at L 9.3, vehicle control system 310 may detect a sharp turn from the initially planned or designated route (e.g., L 9.4, L 9.5, and so on). Vehicle control system 310 may evaluate the sharpness of the turn and determine that the change in direction exceeds a corresponding threshold, such that the turn amounts to a V2X connection trigger. As such, vehicle control system 310 may respond by attempting to establish a preemptive V2X connection. Additionally, or alternatively, vehicle control system 310 may attempt to establish (or reestablish) a connection with a network via RAN node 222 (e.g., base station). Whether through V2X connections or through a connection with the network, the vehicle control system 310 may communicate with a smart V2X connection server 270, and/or another type of server, to obtain information about warnings, conditions, and/or other types of descriptive information about the high-risk event detected by vehicle control system 310. Doing so may better enable the driver of vehicle 300, and/or the driver of another vehicle, to make a more informed decision about whether to continue on the new travel route, find another route, pull over, etc.

Assume that vehicle 300 establishes a V2X connection with another vehicle and exchanges appropriate information in response to the high-risk event. Vehicle control system 310 may maintain the V2X connection until vehicle 300 has traveled a threshold distance away from the high-risk event and/or a threshold period of time has transpired without the detection of any additional V2X connection triggers or the receiving of communications from other V2X-enabled devices warranting the maintenance of the connection. Assume that vehicle 300 continues along the new, actual route resulting from the high-risk event at L 9.3. Depending on whether a new travel route is designated, which may include the destination of the initially designated travel route or a different destination, vehicle control system 310 may again determine relevant high-risk areas or conditions, appropriate V2X preemptive distances for each high-risk area or condition identified and determine an appropriate V2X connection trigger corresponding thereto. Accordingly, the techniques described herein provide solutions for dynamically detecting and responding to sudden, high-risk events, in addition to solutions for automatically reassessing high-risk areas, conditions, and corresponding V2X connection triggers for new travel routes and trajectories.

Figure 10:
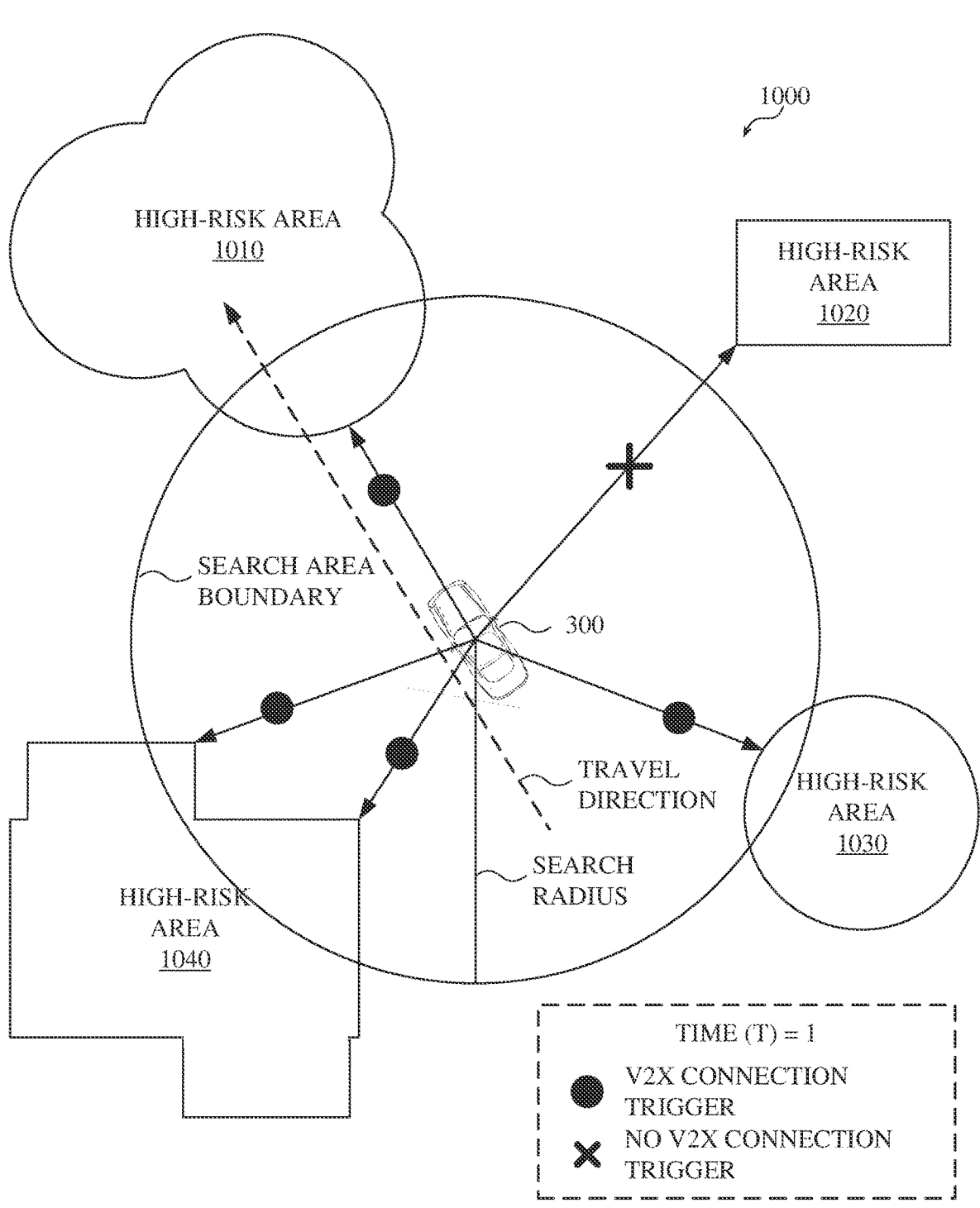
FIGS. 10-11 are diagrams of an example of determining V2X connection triggers for high-risk areas without a designated route according to one or more implementations described herein.
Figure 11:
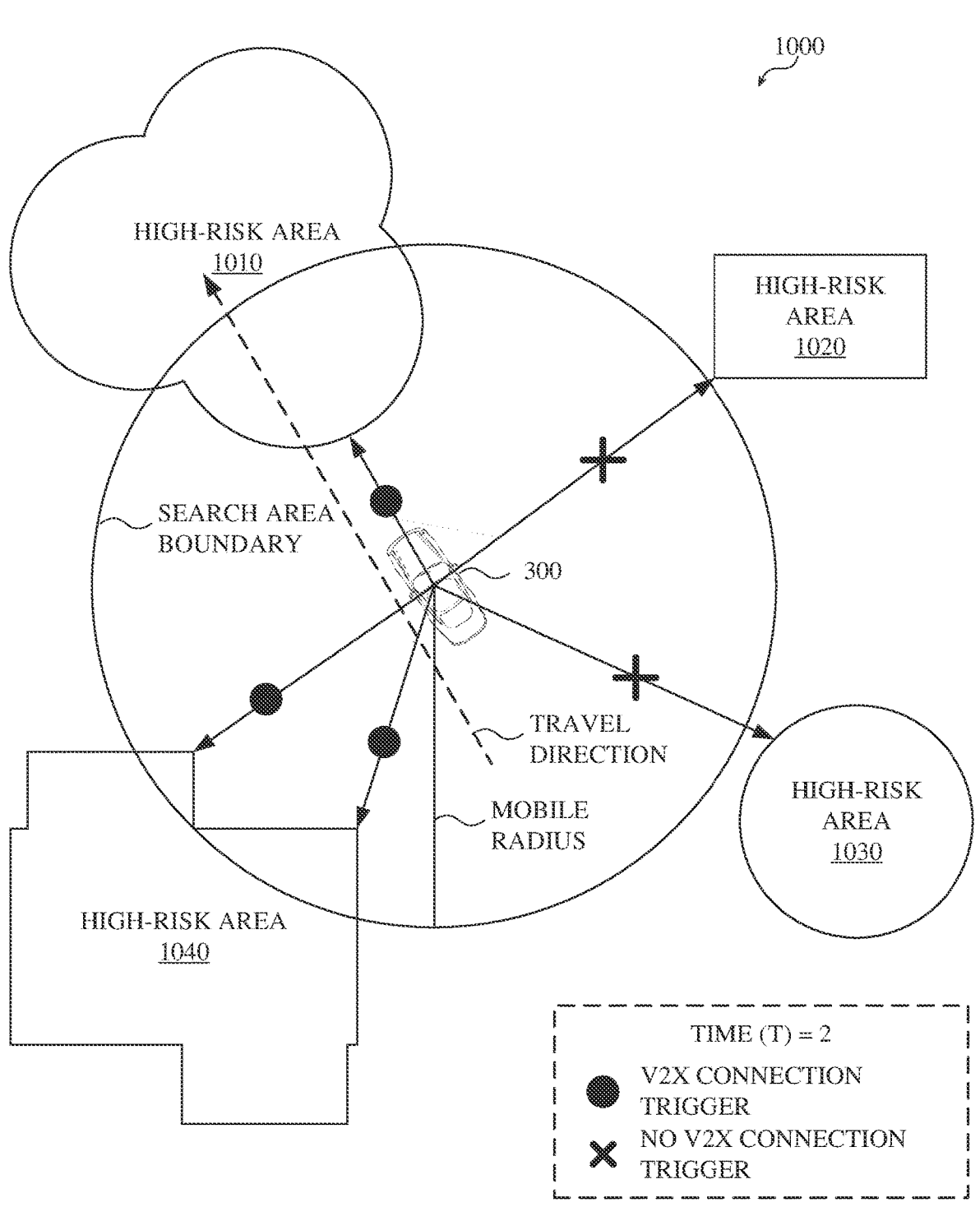

FIGS. 10-11 are diagrams of an example 1000 of determining V2X connection triggers for high-risk areas without a designated route according to one or more implementations described herein. As shown, example 1000 may include V2X-enabled vehicle 300, high-risk areas 1010, 1020, 1030, and 1040, a search radius, and a search area boundary. FIG. 10 refers to example 1000 at time T=1; and FIG. 11 refers to example 1000 at time T=2, as vehicle 300 travels in the indicated direction toward high-risk area 1010. In some implementations, one or more of high-risk areas 1010-1040 may also, or alternatively, be a high-risk condition. Example 1000 of FIGS. 10-11 are provided as a non-limiting example of one or more of the techniques described herein for determining V2X connection triggers for high-risk areas without a designated route.

A vehicle control system 310 (not shown in FIG. 10) of vehicle 300 may determine that a travel route has not been designated and instead may therefore determine high-risk areas and V2X connection triggers in a less route-dependent manner. For example, vehicle control system 310 may obtain smart V2X information from one or more local and/or remote sources and may use the smart V2X information to determine an appropriate radius for defining a search area and search area boundary. This may include vehicle control system 310 determining the geographic coordinates defining the search area and identifying high-risk areas with geographic coordinates in and around the search area. Vehicle control system 310 may also identify the nearest entries points for the high-risk areas and determine a V2X connection trigger for each entry point within the search area boundary. As shown, vehicle control system 310 may determine one or more V2X connection triggers for high-risk areas 1010, 1030, and 1040 since at least a portion of each of these high-risk areas are within the search area boundary. Vehicle control system 310 may not determine a V2X connection triggers for high-risk area 1020 since high-risk area 1020 is not within the search area boundary.

Referring to FIG. 11, vehicle 300 becomes nearer to high-risk area 1010 as vehicle 300 moves along the indicated travel direction. As such, vehicle control system 310 (not shown in FIG. 11) may reassess the high-risk areas and update the V2X connection triggers being monitored by vehicle control system 310. As shown, similar to high-risk area 1020, high-risk area 1030 may now be outside the search area boundary, while high-risk areas 1010 and 1040 may still be within the search area boundary. As such, vehicle control system 310 may not store or monitor a V2X connection trigger for high-risk areas 1020 and 1030; however, vehicle control system 310 may continue to store and monitor one or more V2X connection triggers for each of high-risk areas 1010 and 1040. Accordingly, the techniques described herein provide solutions for dynamically determining, monitoring, and updating multiple V2X connection triggers for multiple high-risk areas and/or high-risk conditions, with or without a designated travel route.

Referring to FIG. 4, process 400 may include determining whether a timer or expiration event has occurred (block 460). For example, vehicle control system 310 may maintain a connection with the network and/or a V2X connection until a corresponding timer (e.g., a V2X connection timer) and/or expiration event (e.g., a V2X connection expiration event) has occurred. An example of an expiration event may include vehicle 300 traveling a specified distance from a high-risk event, V2X connection trigger detection location, high0risk area, and/or high-risk condition. The timer and/or expiration event may be measured from an initial attempt to establish a connection with the network and/or V2X connection, from a successful connection with the network and/or V2X connection, from an entry or exit of a high-risk area or condition, etc. When a timer expiration or expiration event has not been detected (block 460—NO), process 400 may include maintaining or continuing to establish a network connection and/or V2X connection (block 450). When a timer expiration or expiration event has been detected (block 460—YES), process 400 may return to an operation describe above, such as obtaining smart V2X information (block 410), determining V2X connection triggers (block 420), and/or monitoring for V2X connection triggers (block 430).

Figure 12:
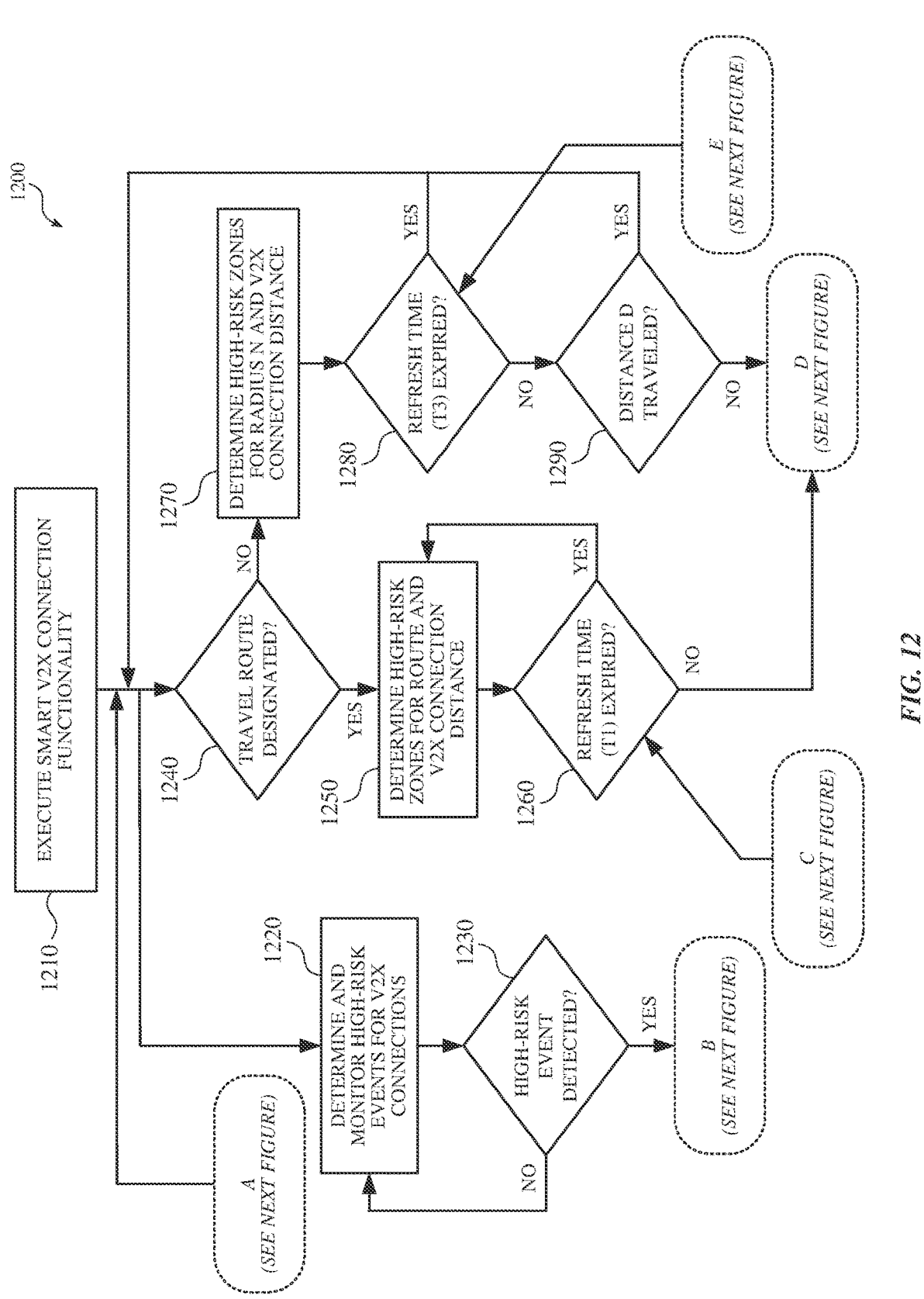
FIGS. 12-13 are diagrams of an example process for smart V2X preemptive connection according to one or more implementations described herein.
Figure 13:
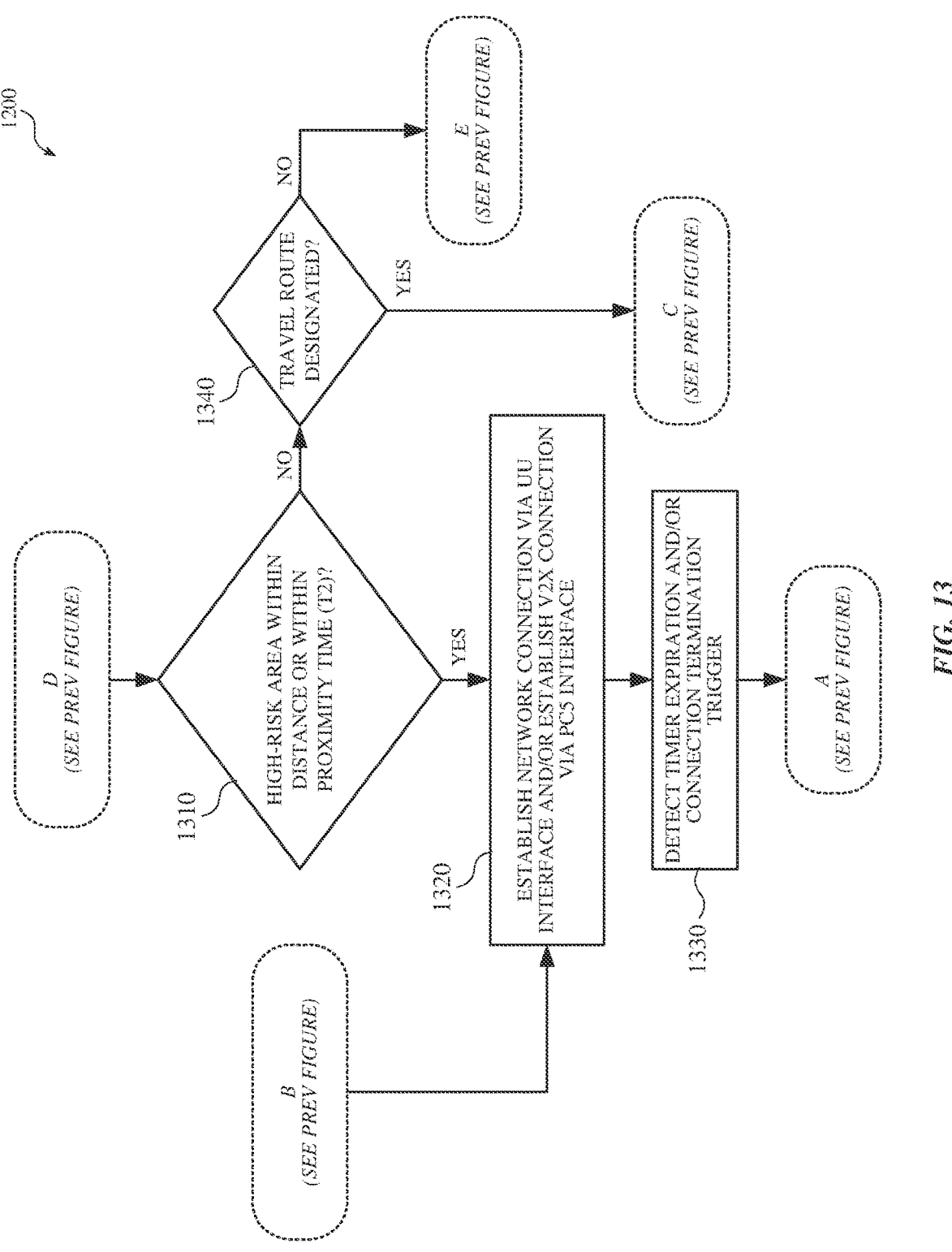

FIGS. 12-13 are diagrams of an example process 1200 for smart V2X preemptive connection according to one or more implementations described herein. Process 1200 may be implemented by UE 210, vehicle 300, and/or one or more components of vehicle control system 310. In some implementations, some or all of process 1200 may be performed by one or more other systems or devices, including one or more of the devices of FIG. 2. Additionally, process 1200 may include one or more fewer, additional, differently ordered and/or arranged operations than those shown in FIGS. 12-13. In some implementations, some or all of the operations of process 1200 may be performed independently, successively, simultaneously, etc., of one or more of the other operations of process 1200. As such, the techniques described herein are not limited to a number, sequence, arrangement, timing, etc., of the operations or process depicted in FIGS. 12-13.

Referring to FIG. 12, process 1200 may include executing smart V2X connection functionality (block 1210). For example, vehicle control system 310 may execute one or more instructions stored on a computer-readable medium (e.g., a memory device) to perform processes and operations for smart V2X preemptive connection as described herein. Process 1200 may include determining high-risk events for V2X connections (block 1220). For example, vehicle control system 310 may obtain smart V2X information which may include one or more events and/or combinations of events that amount to one or more V2X connection triggers and may monitor vehicle 300 for the V2X connection triggers.

When a high-risk event is not detected (block 1230—NO), vehicle control system 310 may continue to monitor vehicle 300 for high-risk events (block 1220). When a high-risk event is detected (block 1230—YES), vehicle control system 310 may establish a network connection via a Uu interface and/or establish a V2X connection via a PC5 interface (block 1320 of FIG. 13). Vehicle control system 310 may maintain the network connection and/or V2X connection until vehicle control system 310 detects the expiration of a timer and/or connection termination trigger for the network connection and/or V2X connection. An example of a connection termination trigger may include a threshold distance traveled by vehicle 300, a V2X connection being terminated by a corresponding UE 210 or vehicle and so on. In response to detecting the timer expiration and/or connection termination trigger, vehicle control system 310 may return to performing one or more of the operations of process 1200, such as determining and/or monitoring vehicle 300 for high-risk events for V2X connections (block 1220 of FIG. 12).

The process of block 1220 may also include determining whether a travel route for vehicle 300 has been designated (block 1240). For example, when a travel route has been designated (block 1240—YES), vehicle control system 310 may determine high-risk zones for the travel route and corresponding V2X connection distances (block 1250). For example, vehicle control system 310 may obtain smart V2X information which may include or define geographic areas of high-risk areas and/or preemptive distances at which vehicle control system 310 is to preemptively initiate connections with the network and/or V2X connections. Vehicle control system 310 may monitor a location of vehicle 300 with respect to the preemptive distances (e.g., V2X connection triggers).

When a refresh timer (T1) has expired (block 1260—YES), process 1200 may return to determining high-risk zones for the designated route and determining V2X connection distances (block 1250). When a refresh timer (T1) has not expired (block 1260—NO), process 1200 may include determining whether a high-risk area is within a V2X connection distance or within a proximity time (T2) (block 1310 of FIG. 13). A proximity time may be determined (by for example vehicle control system 310) based on a current distance from the high-risk area or condition and a current velocity of vehicle 300. When a calculated time of arrival is below a proximity time threshold, vehicle 300 may be within the proximity time (T2).

When vehicle 300 has reached a V2X connection distance and/or is within a proximity time (T2) (block 1310—YES), vehicle control system 310 may establish a network connection via a Uu interface and/or establish a V2X connection via a PC5 interface (block 1320). Vehicle control system 310 may maintain the network connection and/or V2X connection until vehicle control system 310 detects the expiration of a timer and/or connection termination trigger for the network connection and/or V2X connection (block 1330). In response to detecting the timer expiration and/or connection termination trigger, vehicle control system 310 may return to performing one or more of the operations of process 1200, such as determining whether a travel route for vehicle 300 has been designated (block 1240 of FIG. 12).

When a travel route has been designated (block 1240—NO), vehicle control system 310 may determine high-risk zones (e.g., high-risk areas and/or conditions) for a distance radius (N) and V2X connection distance (block 1270). For example, vehicle control system 310 may obtain smart V2X information which may include a distance radius (N) that vehicle control system 310 may use to define a search area and identify high-risk zones within the search area. Vehicle control system 310 may also determine and monitor V2X connection distances for the high-risk zones within the search area.

When a refresh timer (T3) has expired (block 1280—YES), process 1200 may return to determining whether a travel route has been designated (block 1240). When a refresh timer (T3) has not expired (block 1280—NO), process 1200 may include determining whether a distance (D) has been traveled (block 1290). When a distance (D) has been traveled (block 1290—YES), process 1200 may return to determining whether a travel route has been designated (block 1240). When a distance (D) has not been traveled (block 1290—NO), process 1200 may include determining whether a high-risk area is within a V2X connection distance or within a proximity time (T2) (block 1310 of FIG. 13). A proximity time may be determined (by for example vehicle control system 310) based on a current distance from the high-risk area or condition and a current velocity of vehicle 300. When a calculated time of arrival is below a proximity time threshold, vehicle 300 may be within the proximity time (T2).

When vehicle 300 has reached a V2X connection distance and/or is within a proximity time (T2) (block 1310—NO), vehicle control system 310 may determine whether a travel route had been designated (block 1340). When a travel route had been designated (block 1340—YES), process 1200 may include determining whether a refresh timer (T1) has expired (block 1260 of FIG. 12) and performing one or more operations based thereon as described in example process 1200. When a travel route had not been designated (block 1340—NO), process 1200 may include determining whether a refresh timer (T3) has expired (block 1280) and performing one or more operations based thereon as described in example process 1200. Accordingly, the techniques described herein provide solutions for establishing preemptive V2X connections and/or network connections relating to high-risk events, high-risk areas, and high-risk zones.

Figure 14:
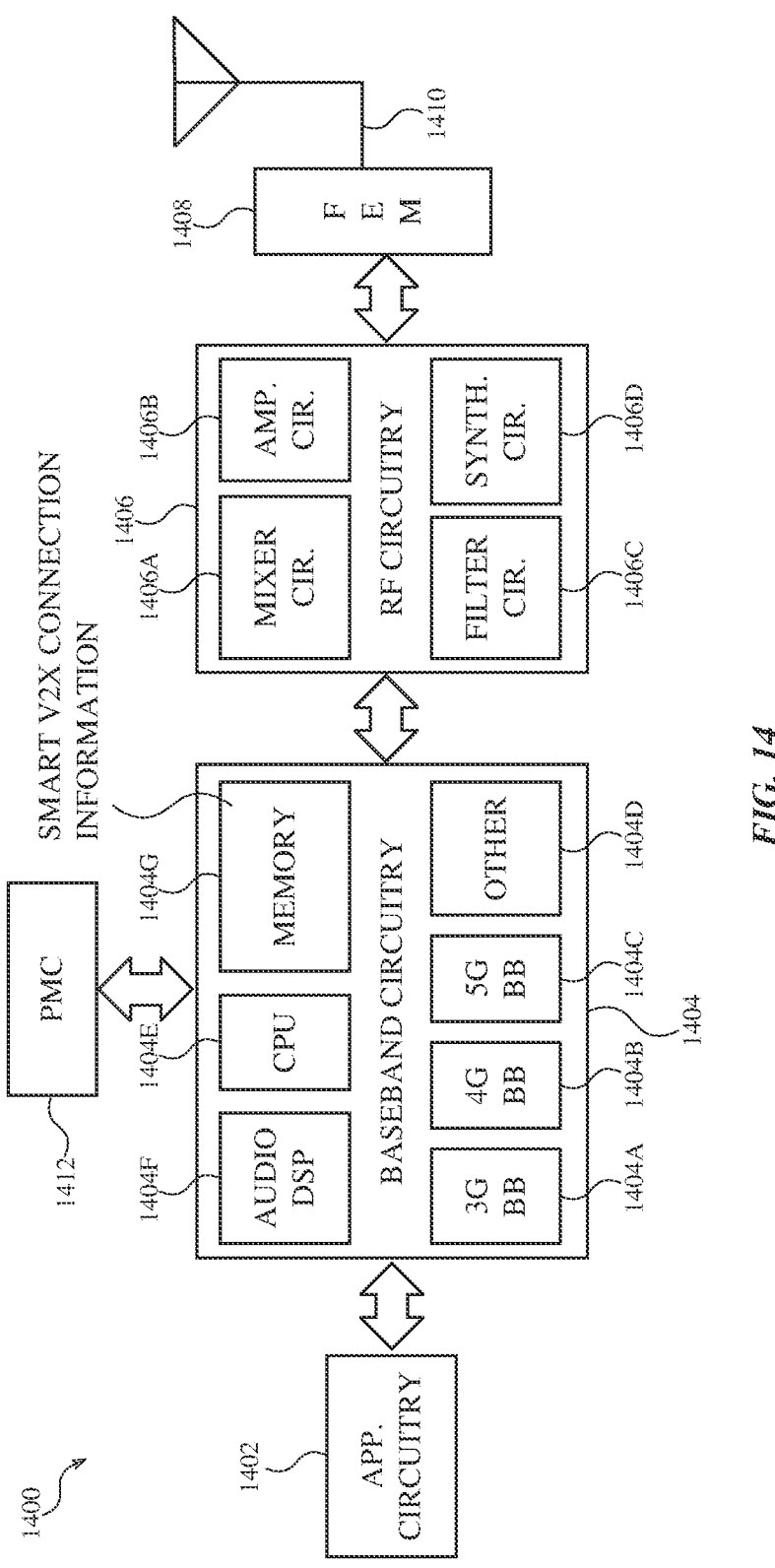
FIG. 14 is a diagram of an example of components of a device according to one or more implementations described herein.

FIG. 14 is a diagram of an example of components of a device according to one or more implementations described herein. In some implementations, the device 1400 can include application circuitry 1402, baseband circuitry 1404, RF circuitry 1406, front-end module (FEM) circuitry 1408, one or more antennas 1410, and power management circuitry (PMC) 1412 coupled together at least as shown. The components of the illustrated device 1400 can be included in a UE or a RAN node. In some implementations, the device 1400 can include fewer elements (e.g., a RAN node may not utilize application circuitry 1402, and instead include a processor/controller to process IP data received from a CN or an Evolved Packet Core (EPC)). In some implementations, the device 1400 can include additional elements such as, for example, memory/storage, display, camera, sensor (including one or more temperature sensors, such as a single temperature sensor, a plurality of temperature sensors at different locations in device 1400, etc.), or input/output (I/O) interface. In other implementations, the components described below can be included in more than one device (e.g., said circuitries can be separately included in more than one device for Cloud-RAN (C-RAN) implementations).

The application circuitry 1402 can include one or more application processors. For example, the application circuitry 1402 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1400. In some implementations, processors of application circuitry 1402 can process IP data packets received from an EPC.

The baseband circuitry 1404 can include circuitry such as, but not limited to, one or more single-core or multi-core processors. The baseband circuitry 1404 can include one or more baseband processors or control logic to process baseband signals received from a receive signal path of the RF circuitry 1406 and to generate baseband signals for a transmit signal path of the RF circuitry 1406. Baseband circuitry 1404 can interface with the application circuitry 1402 for generation and processing of the baseband signals and for controlling operations of the RF circuitry 1406. For example, in some implementations, the baseband circuitry 1404 can include a 3G baseband processor 1404A, a 4G baseband processor 1404B, a 5G baseband processor 1404C, or other baseband processor(s) 1404D for other existing generations, generations in development or to be developed in the future (e.g., 5G, 6G, etc.). The baseband circuitry 1404 (e.g., one or more of baseband processors 1404A-D) can handle various radio control functions that enable communication with one or more radio networks via the RF circuitry 1406. In other implementations, some or all of the functionality of baseband processors 1404A-D can be included in modules stored in the memory 1404G and executed via a Central Processing Unit (CPU) 1404E. The radio control functions can include, but are not limited to, signal modulation/demodulation, encoding/decoding, radio frequency shifting, etc. In some implementations, modulation/demodulation circuitry of the baseband circuitry 1404 can include Fast-Fourier Transform (FFT), precoding, or constellation mapping/de-mapping functionality. In some implementations, encoding/decoding circuitry of the baseband circuitry 1404 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1404G may store smart V2X connection information to enable V2X preemptive connections for emergency and/or potential accident scenarios. Smart V2X connection information may include information and instructions for performing one or more of the techniques and/or examples described herein. Smart V2X connection information may, for example, enable a vehicle (e.g., vehicle 300 and/or UE 210) to determine a current route of the vehicle and one or more high-risk areas through which the vehicle may travel (e.g., a hospital zone, school zone, high vehicle traffic area, high pedestrian traffic area, identified road hazards, etc.). The vehicle may determine a distance (d) from a beginning of the high-risk area and begin establishing a V2X connection (e.g., with other UEs, V2X-enabled vehicles, etc.) upon reaching the determined distance.

Smart V2X connection information may also, or alternatively, enable a vehicle to preemptively establish a V2X connection (e.g., preemptive of a car accident) upon detecting an event indicative of an emergency, a hazardous situation, or a potential emergency. Examples of such events may include a sharp turn, a significant change in a center of gravity of the vehicle, a vehicle speed exceeding a vehicle speed threshold, a sudden acceleration or declaration, a collision, a loss of wheel traction, etc. The preemptive V2X connection may, for example, enable vehicles to begin communicating with one another faster in case of a threat, emergency, or unsafe conditions for vehicles in the area. In doing so, the connected vehicles may send out warnings to each other, rerouting vehicles away from a threat, determine and implement driving conditions (e.g., engaging all-wheel drive, slowing down, pulling over, etc.) that would mitigate the threat, and so on.

In some implementations, the baseband circuitry 1404 can include one or more audio digital signal processor(s) (DSP) 1404F. The audio DSPs 1404F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1404 and the application circuitry 1402 can be implemented together such as, for example, on a system on a chip (SOC).

In some implementations, the baseband circuitry 1404 can provide for communication compatible with one or more radio technologies. For example, in some implementations, the baseband circuitry 1404 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1404 is configured to support radio communications of more than one wireless protocol can be referred to as multi-mode baseband circuitry.

RF circuitry 1406 can enable communication with wireless networks using modulated electromagnetic radiation through a non-solid medium. In various implementations, the RF circuitry 1406 can include switches, filters, amplifiers, etc. to facilitate the communication with the wireless network. RF circuitry 1406 can include a receive signal path which can include circuitry to down-convert RF signals received from the FEM circuitry 1408 and provide baseband signals to the baseband circuitry 1404. RF circuitry 1406 can also include a transmit signal path which can include circuitry to up-convert baseband signals provided by the baseband circuitry 1404 and provide RF output signals to the FEM circuitry 1408 for transmission.

In some implementations, the receive signal path of the RF circuitry 1406 can include mixer circuitry 1406A, amplifier circuitry 1406B and filter circuitry 1406C. In some implementations, the transmit signal path of the RF circuitry 1406 can include filter circuitry 1406C and mixer circuitry 1406A. RF circuitry 1406 can also include synthesizer circuitry 1406D for synthesizing a frequency for use by the mixer circuitry 1406A of the receive signal path and the transmit signal path. In some implementations, the mixer circuitry 1406A of the receive signal path can be configured to down-convert RF signals received from the FEM circuitry 1408 based on the synthesized frequency provided by synthesizer circuitry 1406D. The amplifier circuitry 1406B can be configured to amplify the down-converted signals and the filter circuitry 1406C can be a low-pass filter (LPF) or band-pass filter (BPF) configured to remove unwanted signals from the down-converted signals to generate output baseband signals. Output baseband signals can be provided to the baseband circuitry 1404 for further processing. In some implementations, the output baseband signals can be zero-frequency baseband signals, although this is not a requirement. In some implementations, mixer circuitry

1406A of the receive signal path can comprise passive mixers, although the scope of the implementations is not limited in this respect.

In some implementations, the mixer circuitry 1406A of the transmit signal path can be configured to up-convert input baseband signals based on the synthesized frequency provided by the synthesizer circuitry 1406D to generate RF output signals for the FEM circuitry 1408. The baseband signals can be provided by the baseband circuitry 1404 and can be filtered by filter circuitry 1406C.

In some implementations, the mixer circuitry 1406A of the receive signal path and the mixer circuitry 1406A of the transmit signal path can include two or more mixers and can be arranged for quadrature down conversion and up conversion, respectively. In some implementations, the mixer circuitry 1406A of the receive signal path and the mixer circuitry 1406A of the transmit signal path can include two or more mixers and can be arranged for image rejection (e.g., Hartley image rejection). In some implementations, the mixer circuitry 1406A of the receive signal path and the mixer circuitry 1406A can be arranged for direct down conversion and direct up conversion, respectively. In some implementations, the mixer circuitry 1406A of the receive signal path and the mixer circuitry 1406A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1406 can include analog-to-digital converter (ADC) and digital-to-analog converter (DAC) circuitry and the baseband circuitry 1404 can include a digital baseband interface to communicate with the RF circuitry 1406.

In some dual-mode implementations, a separate radio IC circuitry can be provided for processing signals for each spectrum, although the scope of the implementations is not limited in this respect.

In some implementations, the synthesizer circuitry 1406D can be a fractional-N synthesizer or a fractional N/N+1 synthesizer, although the scope of the implementations is not limited in this respect as other types of frequency synthesizers can be suitable. For example, synthesizer circuitry 1406D can be a delta-sigma synthesizer, a frequency multiplier, or a synthesizer comprising a phase-locked loop with a frequency divider.

The synthesizer circuitry 1406D can be configured to synthesize an output frequency for use by the mixer circuitry 1406A of the RF circuitry 1406 based on a frequency input and a divider control input. In some implementations, the synthesizer circuitry 1406D can be a fractional N/N+1 synthesizer.

In some implementations, frequency input can be provided by a voltage-controlled oscillator (VCO), although that is not a requirement. Divider control input can be provided by either the baseband circuitry 1404 or the applications circuitry 1402 depending on the desired output frequency. In some implementations, a divider control input (e.g., N) can be determined from a look-up table based on a channel indicated by the applications circuitry 1402.

Synthesizer circuitry 1406D of the RF circuitry 1406 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1406D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1406 can include an IQ/polar converter.

FEM circuitry 1408 can include a receive signal path which can include circuitry configured to operate on RF signals received from one or more antennas 1410, amplify the received signals and provide the amplified versions of the received signals to the RF circuitry 1406 for further processing. FEM circuitry 1408 can also include a transmit signal path which can include circuitry configured to amplify signals for transmission provided by the RF circuitry 1406 for transmission by one or more of the one or more antennas 1410. In various implementations, the amplification through the transmit or receive signal paths can be done solely in the RF circuitry 1406, solely in the FEM circuitry 1408, or in both the RF circuitry 1406 and the FEM circuitry 1408.

In some implementations, the FEM circuitry 1408 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1406). The transmit signal path of the FEM circuitry 1408 can include a power amplifier (PA) to amplify input RF signals (e.g., provided by RF circuitry 1406), and one or more filters to generate RF signals for subsequent transmission (e.g., by one or more of the one or more antennas 1410).

In some implementations, the PMC 1412 can manage power provided to the baseband circuitry 1404. In particular, the PMC 1412 can control power-source selection, voltage scaling, battery charging, or DC-to-DC conversion. The PMC 1412 can often be included when the device 1400 is capable of being powered by a battery, for example, when the device is included in a UE. The PMC 1412 can increase the power conversion efficiency while providing desirable implementation size and heat dissipation characteristics.

While FIG. 14 shows the PMC 1412 coupled only with the baseband circuitry 1404. However, in other implementations, the PMC 1412 may be additionally or alternatively coupled with, and perform similar power management operations for, other components such as, but not limited to, application circuitry 1402, RF circuitry 1406, or FEM circuitry 1408.

In some implementations, the PMC 1412 can control, or otherwise be part of, various power saving mechanisms of the device 1400. For example, if the device 1400 is in an RRC_Connected state, where it is still connected to the RAN node as it expects to receive traffic shortly, then it can enter a state known as Discontinuous Reception Mode (DRX) after a period of inactivity. During this state, the device 1400 can power down for brief intervals of time and thus save power.

If there is no data traffic activity for an extended period of time, then the device 1400 can transition off to an RRC_Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1402 and processors of the baseband circuitry 1404 can be used to execute elements of one or more instances of a protocol stack. For example, processors of the baseband circuitry 1404, alone or in combination, can be used execute Layer 3, Layer 2, or Layer 1 functionality, while processors of the baseband circuitry 1404 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 15:
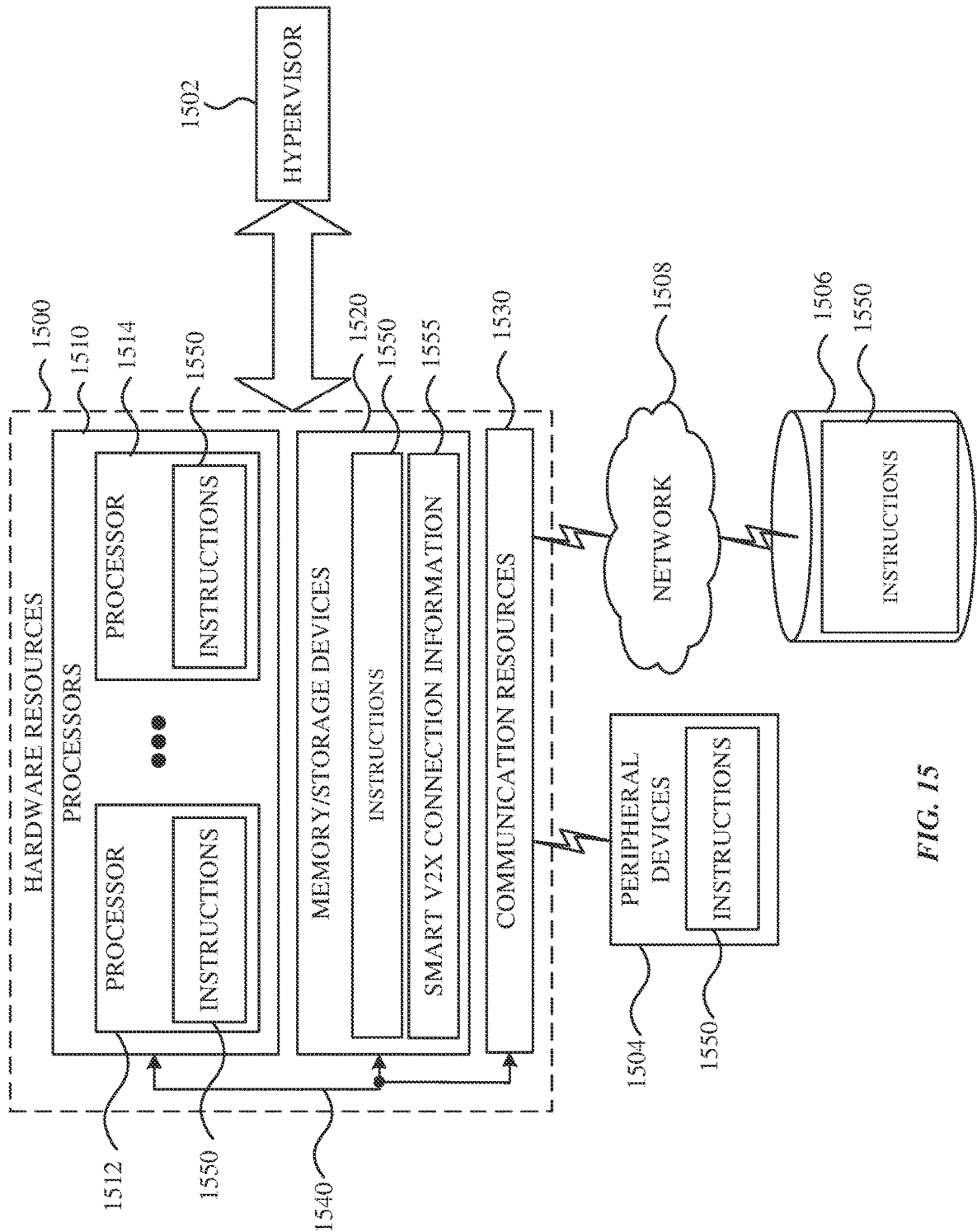
FIG. 15 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors 1510 (or processor cores), one or more memory/storage devices 1520, and one or more communication resources 1530, each of which may be communicatively coupled via a bus 1540. For implementations where node virtualization (e.g., NFV) is utilized, a hypervisor 1502 may be executed to provide an execution environment for one or more network slices/sub-slices to utilize the hardware resources 1500.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514.

The memory/storage devices 1520 may include main memory, disk storage, or any suitable combination thereof. The memory/storage devices 1520 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1520 may store smart V2X connection information 1555 to enable smart V2X preemptive connections for emergency and/or potential accident scenarios. Smart V2X connection information may include information and instructions for performing one or more of the techniques and/or examples described herein. Smart V2X connection information may, for example, enable a vehicle (e.g., vehicle 300 and/or UE 210) to determine a current route of the vehicle and one or more high-risk areas through which the vehicle may travel (e.g., a hospital zone, school zone, high vehicle traffic area, high pedestrian traffic area, identified road hazards, etc.). The vehicle may determine a distance (d) from a beginning of the high-risk area and begin establishing a V2X connection (e.g., with other UEs, V2X-enabled vehicles, etc.) upon reaching the determined distance.

Smart V2X connection information may also, or alternatively, enable a vehicle to preemptively establish a V2X connection (e.g., preemptive of a car accident) upon detecting an event indicative of an emergency, a hazardous situation, or a potential emergency. Examples of such events may include a sharp turn, a significant change in a center of gravity of the vehicle, a vehicle speed exceeding a vehicle speed threshold, a sudden acceleration or declaration, a collision, a loss of wheel traction, etc. The preemptive V2X connection may, for example, enable vehicles to begin communicating with one another faster in case of a threat, emergency, or unsafe conditions for vehicles in the area. In doing so, the connected vehicles may send out warnings to each other, rerouting vehicles away from a threat, determine and implement driving conditions (e.g., engaging all-wheel drive, slowing down, pulling over, etc.) that would mitigate the threat, and so on.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the example described herein, a user equipment (UE), may comprise: a memory; and one or more processors configured to, when executing instructions stored in the memory, cause the UE to: determine at least one vehicle-to-everything (V2X) connection trigger; monitor the V2X connection trigger; establish a V2X connection in response to detecting the V2X connection trigger; and communicate, via the V2X connection, with another UE. In example 2, which may also include one or more of the examples described herein, the UE comprises a vehicle control system of a vehicle.

In example 3, which may also include one or more of the examples described herein, the V2X connection trigger comprises the UE arriving at a geographic location of a specified distance from a high-risk area. In example 4, which may also include one or more of the examples described herein, the high-risk area is determined based on a travel route designated for the UE. In example 5, which may also include one or more of the examples described herein, the high-risk area is determined based on a search area defined by a geographic radius.

In example 6, which may also include one or more of the examples described herein, the V2X connection trigger is subject to a refresh timer. In example 7, which may also include one or more of the examples described herein, the V2X connection trigger comprises the UE arriving at a geographic location of a specified distance from a high-risk condition. In example 8, which may also include one or more of the examples described herein, the V2X connection trigger comprises a high-risk event indicative of an imminent threat to the UE.

In example 9, which may also include one or more of the examples described herein, the V2X connection trigger is not subject to a refresh timer. In example 10, which may also include one or more of the examples described herein, the UE is to maintain the V2X connection until detecting an expiration of a V2X connection timer. In example 11, which may also include one or more of the examples described herein, the UE is to maintain the V2X connection until detecting an expiration of a V2X connection event. In example 12, which may also include one or more of the examples described herein, wherein the V2X connection event comprises a distance traveled by the UE.

In example 13, which may also include one or more of the example described herein, a method performed by a user equipment (UE), the method may comprise: determining at least one vehicle-to-everything (V2X) connection trigger; monitoring the V2X connection trigger; establishing a V2X connection in response to detecting the V2X connection trigger; and communicating, via the V2X connection, with another UE. In example 14, which may also include one or more of the example described herein, a non-transitory computer-readable medium, may comprise: instructions that when executed by one or more processors cause the one or more processors to: determine at least one vehicle-to-everything (V2X) connection trigger; monitor the V2X connection trigger; establish a V2X connection in response to detecting the V2X connection trigger; and communicate, via the V2X connection, with another UE.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:

1. A user equipment (UE), comprising:
a memory; and one or more processors configured to, when executing instructions stored in the memory, cause the UE to:
determine a vehicle-to-everything (V2X) connection trigger, the V2X connection trigger comprising the UE arriving at a location that is a preemptive distance from a particular area;
monitor for the V2X connection trigger;
establish a V2X connection in response to detecting the V2X connection trigger; and
communicate, via the V2X connection, with another UE.

2. The UE of claim 1, wherein the UE comprises a vehicle control system of a vehicle.

3. The UE of claim 1, wherein the particular area is determined based on a travel route designated for the UE.

4. The UE of claim 1, wherein the particular area is determined based on a search area defined by a geographic radius.

5. The UE of claim 1, wherein the V2X connection trigger is subject to a refresh timer.

6. The UE of claim 1, wherein the V2X connection trigger is not subject to a refresh timer.

7. The UE of claim 1, wherein the UE is to maintain the V2X connection until detecting an expiration of a V2X connection timer.

8. The UE of claim 1, wherein the UE is to maintain the V2X connection until detecting an expiration of a V2X connection event.

9. The UE of claim 8, wherein the V2X connection event comprises a distance traveled by the UE.

10. The UE of claim 1, wherein the location has a risk level below a threshold and the particular area has a risk level above the threshold.

11. The UE of claim 1, wherein the particular area is outside a path along which the UE is traveling.

12. A method performed by a user equipment (UE), the method comprising:
determining a vehicle-to-everything (V2X) connection trigger, wherein the V2X connection trigger comprises a change in motion of the UE that is associated with a risk level greater than a risk level of the UE prior to activation of the V2X connection trigger;
monitoring for the V2X connection trigger;
establishing a V2X connection in response to detecting the V2X connection trigger; and
communicating, via the V2X connection, with another UE.

13. The method of claim 12, wherein the UE comprises a vehicle control system of a vehicle.

14. The method of claim 12, wherein the change in motion of the UE comprises at least one of: a rate of change in direction of the UE, a change in center of gravity of the UE, an acceleration of the UE, or a deceleration of the UE.

15. The method of claim 12, wherein the V2X connection trigger is configured to activate in anticipation of the UE entering an emergency state with enough time for the UE to establish the V2X connection before the UE enters the emergency state.

16. The method of claim 15, wherein the communicating is in response to the UE entering the emergency state and notifies the other UE of the emergency state.

17. A baseband processor configured to cause a user equipment (UE) to:
determine a vehicle-to-everything (V2X) connection trigger, wherein the V2X connection trigger is configured to activate in anticipation of the UE entering a state associated with a higher risk level than the UE is at during activation of the V2X connection trigger and with enough time for the UE to establish a V2X connection before the UE enters the state;

monitor for the V2X connection trigger;

establish the V2X connection in response to detecting the V2X connection trigger; and communicate, via the V2X connection, with another UE.

18. The baseband processor of claim 17, wherein the V2X connection trigger comprises the UE arriving at a geographic location of a specified distance from an area associated with the higher risk level.

19. The baseband processor of claim 18, wherein the area is determined based on a travel route designated for the UE.

20. The baseband processor of claim 17, further configured to cause the UE to:

transition from an RRC_idle state to an RRC_connected state in response to detecting the V2X connection trigger.

\* \* \* \* \*